United States Patent [19]
Seib et al.

[11] Patent Number: 5,855,946
[45] Date of Patent: Jan. 5, 1999

[54] FOOD GRADE STARCH RESISTANT TO α-AMYLASE AND METHOD OF PREPARING THE SAME

[75] Inventors: Paul A. Seib; Kyungsoo Woo, both of Manhattan, Kans.

[73] Assignee: Kansas State University Research Foundation, Manhattan, Kans.

[21] Appl. No.: 870,955

[22] Filed: Jun. 6, 1997

[51] Int. Cl.$^6$ .................................................. A21D 13/00
[52] U.S. Cl. ........................... 426/549; 426/94; 426/578; 426/661; 127/67; 127/71
[58] Field of Search .................................. 426/549, 547, 426/578, 96, 661; 127/65, 67, 69, 70, 71

[56] References Cited

U.S. PATENT DOCUMENTS

| | | |
|---|---|---|
| 2,626,257 | 1/1953 | Caldwell et al. . |
| 2,801,242 | 7/1957 | Kerr et al. . |
| 2,852,393 | 9/1958 | Kerr et al. . |

OTHER PUBLICATIONS

Englyst et al.; Classification and measurement of nutritionally important starch fractions; European J. Clin. Nutrition; 45:533–550 (Suppl. 2) (1992).

Ranhotra et al., Effect of Resistant Starch on Blood and Liver Lipids in Hamsters; Cereal Chem.; 73(2);176–178 (1996).

Eerlingen et al.; Enzyme–Resistant Starch. I. Quantitive and Quantative Influence of Incubation Tiime and Temperature of Autoclaved Starch on Resistant Starch Formation; Cereal Chem.; 70(3):339–344 (1993).

Extrusion Communique/Jul.–Aug. 1996; IE Ingredients Extra–National Starch and APV find high–fibre extrusion success.

Sievert et al., Enzyme–Resistant Starch. I. Characterization and Evaluation by Enzymatic, Thermoanalytical, and Microscopic Methods; Cereal Chem.; 66(4):342–347 (1989).

Janzen; Verdaulichkeit von Stärken und phosphatierten; Die Stärke; No. Sep. 1921. Jahrg. (1966).

English Translation of Janzen Article; Die Starke, No. Sep. 1921, Jahrg. (1966).

*Primary Examiner*—Lien Tran
*Attorney, Agent, or Firm*—Hovey, Williams, Timmons & Collins

[57] ABSTRACT

Chemically modified $RS_4$ starches are provided which have a high degree of resistance to α-amylase digestion and can serve as low calorie food additives in products such as breads or crackers as a source of dietary fiber. The starches of the invention can be prepared from any type of starting starch (e.g., wheat, corn, oat, rice, tapioca, mung bean, potato or high amylose starches) and are preferably formed as phosphorylated distarch phosphodiesters. The preferred phosphorylating agent is a mixture of sodium trimetaphosphate (STMP) and sodium tripolyphosphate (STPP) in the presence of sodium chloride or sulfate. The starches are advantageously prepared in an aqueous slurry reaction at basic pH and moderate heating.

23 Claims, 13 Drawing Sheets

```
┌─────────────────────────────────────────────────────────────────┐
│  250 mg STARCH IN 25 ml OF 0.1 M (pH 6.9) PHOSPHATE             │
│  BUFFER WITH PPA (25,000 UNITS) AND 0.02% SODIUM AZIDE          │
└─────────────────────────────────────────────────────────────────┘
                            │     1) INCUBATE AT 37 °C FOR 16 h
                            │        WITH STIRRING
                            │     2) CENTRIFUGE AT 3,000 g x 10 MIN
                            ▼
┌─────────────────────────────────────────────────────────────────┐
│  0.5 ml ALIQUOT OF SUPERNATANT, ADD AMYLOGLUCOSIDASE            │
│  IN 0.1 M SODIUM ACETATE BUFFER (9.5 ml), pH 4.0;               │
└─────────────────────────────────────────────────────────────────┘
                            │     1) INCUBATE AT 55 °C FOR 60 MIN
                            │        WITH SHAKING
                            │     2) CENTRIFUGE AT 3,000 g x 10 MIN
                            ▼
┌─────────────────────────────────────────────────────────────────┐
│  0.1 ml ALIQUOT OF SUPERNATANT, MIX WITH 1.9 ml WATER,          │
│  ADD A TRIETHANOLAMINE BUFFER (pH 7.6) SOLUTION (1.0 ml)        │
│  OF NADP AND ATP, THEN 0.02 ml OF 3.2 M AMMONIUM                │
│  SULPHATE SOLUTION CONTAINING HEXOKINASE AND                    │
│  GLUCOSE-6-PHOSPHATE DEHYDROGENASE                              │
└─────────────────────────────────────────────────────────────────┘
                            │     1) INCUBATE AT 25 °C FOR 20 MIN
                            │        WITH MIXING
                            │     2) READ ABSORBANCE AT 340 nm
                            ▼
┌─────────────────────────────────────────────────────────────────┐
│  GLUCOSE (mg) x 0.9 = DIGESTABLE STARCH (DS)(mg)                │
│  RS = (250 - DS) x (100) / 250                                  │
└─────────────────────────────────────────────────────────────────┘
```

Fig. 2.

FOOD GRADE STARCH RESISTANT TO α-AMYLASE AND METHOD OF PREPARING THE SAME

BACKGROUND OF THE INVENTION

1. Field of the Invention

The present invention is broadly concerned with chemically modified starches highly resistant to α-amylase digestion, food products containing such modified starches, and methods of forming the starches. More particularly, the invention pertains to such starches wherein the starches are of the $RS_4$ variety and exhibit at least about 20% resistance to α-amylase digestion; these starches may be incorporated into yeast- or chemically-leavened food products, such as breads and crackers to provide a low calorie source of dietary fiber. The starches hereof are preferably prepared by cross-linking thereof using a multifunctional phosphorylating agent (e.g., sodium trimetaphosphate (STMP) or a mixture of STMP and sodium tripolyphosphate (STPP)).

2. Description of the Prior Art

Starch serves as a food reserve in plants, and it is an important component in the human diet. The digestion of starch is mediated by salivary and pancreatic α-amylase, which catalyze the formation of maltose, maltotriose and dextrins. The latter products are further hydrolyzed to D-glucose in the brush border of the small intestines. α-Amylases (MW 50,000–60,000 Daltons) are endo-acting enzymes that catalyze the hydrolysis of the α-1,4 bonds in the amylose and amylopectin molecules that comprise starch; they do not hydrolyze the α-1,6-bonds but can by-pass them. Glucoamylase and α-glucosidase are exo-acting enzymes that cleave both α-1,4 and α-1,6 linkages between D-glucose.

In the early 1980's it became apparent that some starch resists digestion. Instead, it enters the colon where it is fermented by bacteria. The resistance of starch to digestion in the upper GI tract is recognized to depend on intrinsic factors, which include the physical state of a food and its preparation and storage, and on extrinsic factors, which are the physiological conditions influencing starch digestion. Starch entering the colon exerts a number of different physiological effects (see below) compared to just one in the upper gastrointestinal tract, namely production of D-glucose to provide energy.

In 1987 Englyst and Cummings at the MRC Dunn Clinical Nutrition Center in Cambridge, UK, proposed a classification of starch based on its likely digestive properties in vivo. They also devised in vitro assay methods to mimic the various digestive properties of starch. Three classes of dietary starch were proposed:

(1) Rapidly Digestible Starch (RDS). RDS is likely to be rapidly digested in the human small intestine; examples include freshly cooked rice and potato, and some instant breakfast cereals.

(2) Slowly Digestible Starch (SDS). SDS is likely to be slowly yet completely digested in the small intestine; examples include raw cereal starch and cooked pasta.

(3) Resistant Starch (RS). RS is likely to resist digestion in the small intestine. RS is thus defined as the sum of starch and starch degradation products not likely to be absorbed in the small intestine of healthy individuals. RS can be subdivided into four categories depending on the causes of resistance (Englyst et al 1992; Eerlingen et al 1993).

$RS_1$. Physically inaccessible starch due to entrapment of granules within a protein matrix or within a plant cell wall, such as in partially milled grain or legumes after cooing.

$RS_2$. Raw starch granules, such as those from potato or green banana, that resist digestion by α-amylase, possibly because those granules lack micropores through their surface.

$RS_3$. Retrograded amylose formed by heat/moisture treatment of starch or starch foods, such as occurs in cooked/cooled potato and corn flake.

$RS_4$. Chemically modified starches, such as acetylated, hydroxypropylated, or cross-linked starches that resist digestion by alpha-amylase. Those modified starches would be detected by the in vitro assay of RS. However, some $RS_4$ may not be fermented in the colon.

$RS_1$, $RS_2$, $RS_3$ are physically modified forms of starch and become accessible to α-amylase digestion upon solubilization in sodium hydroxide or dimethyl sulfoxide. $RS_4$ is chemically modified and remains resistant to α-amylase digestion even if dissolved.

RS is of increasing interest as a food ingredient. Unlike common dietary fiber sources, RS does not hold much water and, thus may be a preferred fiber source for use in low moisture products such as cookies and crackers. Also, RS is free of a gritty mouthfeel, and unlike traditional fiber sources does not significantly alter flavor and textural properties of foods. Those characteristics can improve the processing and quality of foods such as baked and extruded products when RS is added. Furthermore, RS constitutes dietary fiber, and may be assigned zero calories.

RS is counted with the dietary fiber fraction of food and is believed to function as fiber in the human digestive tract. The reduced bioavailability of RS in the human gastrointestinal tract has significant physiological effects, such as slow glucose release and a lower postprandial glycemic response with lower blood lipids. When RS reaches the colon it is fermented to hydrogen, methane, carbon dioxide, lactic acid (transient), and short chain fatty acids (acetate, propionate, and butyrate)with purported beneficial effects that suggest prevention of colonic diseases.

It is known that the digestibility of starches can be affected by processing and storage conditions. Chemical modification of starches has been shown to inhibit their in vitro digestibility, with the extent of inhibition related to the degree of modification and presumably the type of modification. The variation depends on the botanical origin of the starch, the modifying agent(s) used and the subsequent chemical bonds and derivatives formed, the extent of granule gelatinization, and choice of enzyme (Anonymous 1972, Filer 1971). Banks et al (1973) demonstrated that the degree of substitution determined the rate and extent of amylolytic attack on hydroxyethyl amylose.

Leegwater and Luten (1971) reported an exponential decrease in the digestibility of hydroxypropyl substituted starches by pancreatin with an increasing degree of substitution up to 0.45% HP. Janzen (1969) reported that potato starch phosphate cross-linked with 0.05 and 0.1% $POCl_3$ has no influence on the in vitro digestion with pancreatin as determined by the weight of residue after digestion. Modification with 0.5 and 1.5% $POCl_3$, however, inhibits the hydrolysis considerably. Hood and Arneson (1976) have reported that hydroxypropyl distarchphosphate modification increases the digestion of ungelatinized starch but decreases the digestion of gelatinized starch. Introduction of cross-links tends to stabilize granule structure and restrict the degree of swelling. With a high degree of cross-linking the porosity of the gel phase of a granule will be too fine to admit large molecules. Some reports have indicated that phosphate cross-linking slightly reduces enzymatic hydrolysis or has no effect on hydrolysis when compared to the unmodified starch (Anonymous 1972, Östergard, 1988; Björck et al., 1988). Changes in the intestinal microflora of rats eating hydroxypropyl distarch phosphate, hydroxypropyl starch, and distarch phosphate suggest that starches containing ether linkages are more difficult to digest than those containing only phosphate linkages (Hood, 1976). A hydroxypropyl distarch phosphate derivative of potato starch exhibits 50% in vivo digestibility in rat (Björck et al., 1988).

In view of the known health benefits of dietary fibers in general, and the potentially advantageous additional properties of $RS_4$ starches in food products, there is a need in the art for improved $RS_4$ starches having a high degree of resistance to α-amylase digestion, as well as low-cost methods of producing such chemically modified starches.

SUMMARY OF THE INVENTION

The present invention overcomes the problems outlined above and provides chemically modified starches exhibiting at least about a 20% resistance to α-amylase digestion, as measured using American Association of Analytical Chemists (AOAC) Method 992.16 (1995). More preferably, the starches have at least about 35% resistance, and most preferably at least about 50% resistance to α-amylase digestion using the foregoing method. A wide variety of native starches can be used in the preparation of the chemically modified starches of the invention, for example, starches taken from the group consisting of the cereal, root, tuber, legume and high amylose starches; specific examples of preferred starches include wheat, corn, oat, rice, tapioca, mung bean and potato starches.

The preferred starches are cross-linked, although acetyl, succinyl, and phosphoryl groups may increase (α-amylase digestion resistance. Cross-linked starches are most preferably phosphorylated to form distarch phosphate diesters and contain at least 0.1% by weight residual phosphorous, and more preferably at least about 0.2% by weight thereof. The most preferred phosphorylating agent is either STMP alone or a mixture of STMP and STPP. Generally, where the mixture is used, it should comprise from about 1–20% by weight STMP (most preferably from about 5–12% weight STMP) and from about 0.01–0.2% by weight STPP (most preferably from about 0.05–0.12% by weight STPP). The STMP/STPP mixture is advantageously used at a level of from about 1–20% by weight, and more preferably from about 5–12% by weight, based upon the weight of the starting unmodified starch taken as 100% by weight. Where STMP is used alone, the above broad and preferred ranges could also be employed. Another useful phosphorylating agent is phosphoryl chloride. In addition, other cross-linking agents such adipic acid or epichlorohydrin could also be employed.

The chemically modified starches of the invention find particular utility as a food additive, particularly in yeast- or chemically-leavened, wheat-based, baked or fried food such as breads and crackers. In this context, the starches of the invention serve as a low calorie source of dietary fiber and resistant starch. Generally, the modified starches would be used in food products of up to a level from about 25% by weight, and more preferably up to about 15% by weight. It is conceivable they could be used up to 35% by weight.

The chemically modified starches are prepared by reacting a starting (usually native and unmodified) starch in the presence of water and with a cross-linking agent under conditions of pH and temperature to yield a modified starch having the aforementioned (α-amylase digestion properties. The preferred preparation method involves initially forming a slurry of the starting starch in water and adding the cross-linking agent to the slurry. The slurry would typically have from about 15–60% by weight starch, and more preferably from about 30–50% by weight thereof. The preferred phosphorylating cross-linker would be STMP alone or the STMP/STPP mixture described previously. Preferred reaction conditions include a basic pH (preferably from about 10–13 and more preferably from about 11–12) and a reaction temperature of from about 25°–70° C. and more preferably from about 30°–50° C. The reaction need be carried out only for a sufficient time to provide the requisite degree of (α-amylase digestion resistance, and this would normally be for a period of from about ⅙ to 24 h., more preferably from about 1–3 h. Where STMP or the STMP/STPP mixture is used as the phosphorylating agent, it is sometimes preferred to add an amount (from about 0.1–20% by weight, based upon the weight of the starting starch taken as 100% by weight) of sodium sulfate or sodium chloride to the slurry. The presence of one of these salts serves to retard gel formation during the reaction and to accelerate the reaction by increasing the base adsorbed by the starch granules.

BRIEF DESCRIPTION OF THE DRAWINGS

FIG. 2 is a schematic representation of a modified method of measuring RS using porcine pancreatic α-amylase;

DETAILED DESCRIPTION OF THE PREFERRED EMBODIMENT

Examples

Figure 1:
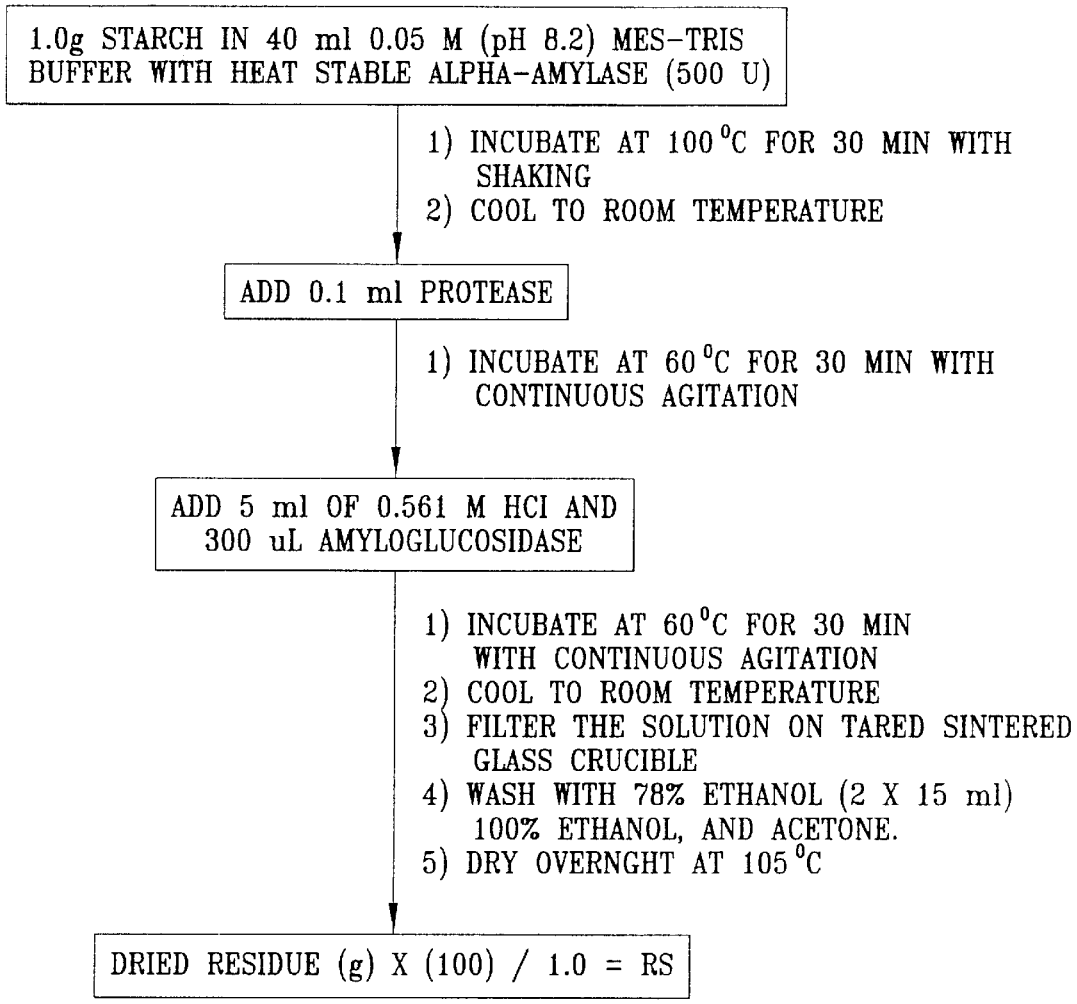
FIG. 1 is a schematic representation of the steps involved in the AOAC measurement for RS using α-amylase.

In the following examples, studies were prepared by phosphorylating starches (wheat, corn, potato, rice, tapioca, mung bean, oat) with STMP/STPP and other cross-linkers, the level of $RS_4$ in starch products having varying P levels up to 0.4% was determined, serum cholesterol response and cecum short-chain fatty acid (SCFA) levels in growing hamsters fed diets containing $RS_4$ and cellulose were ascertained.

MATERIALS AND METHODS

Materials

The following items were purchased from Sigma Chemical Co (St. Louis); corn, potato, and rice starches, sodium trimetaphosphate, epichlorohydrin, amyloglucosidase solution (Cat. No. A 9913), protease solution (Cat. No. P 3910), Type IV-B α-amylase (Cat. No. A 3176), and cholesterol and HDL cholesterol diagnostic kits (Cat. No. 352 and 352-3, respectively). Mung bean starch was purchased from a local Asian food store. The pig pancreatic α-amylase (PPA) contained 23 U/mg of solid, where one unit liberates 1.0 mg maltose from starch in 3 min. at pH 6.9 and 20° C. Wheat starch (Midsol 50) was provided by Midwest Grain Products Co. (Atchison, Kans.), tapioca starch and Novelose (resistant starch) from National Starch and Food Company (Bridgewater, N.J.), and CrystaLean (resistant starch), from Opta Food Ingredients, Inc. (Bedford, Mass.). Phosphoryl chloride was obtained from Aldrich Chemical Company (Milwaukee, Wis.). Termamyl, a thermo-stable α-amylase was obtained in solution form from NOVO (Novo Nordisk, Franklinton, N.C.). Termamyl had an enzyme activity of $9.78 \times 10^3$ U/ml, where one unit, as defined by Robyt and Whelan (1968), liberates one $\mu$mol of reducing groups per min in a 20 mg/ml soluble starch solution at 25° C. and optimum pH. Glucose enzyme assay kit (Test combination, Cat. No. 716251) was purchased from Boehringer Mannheim (Indianapolis, Ind.). Male, weanling golden Syrian hamsters were purchased from Sasko, Inc (Omaha, Nebr.), and cellulose (CL, Solka-Floc)was from FS & D Corp. (Urbana, Ohio).

General Methods

All chemical analyses were done in triplicate unless otherwise stated. Protein was assayed by Kjeldahl nitrogen (AACC Method 46-13), ash by dry combustion, (AACC Method 08-01), and moisture by oven-drying a sample for 1 h at 130° C. (AACC Method 44-15). Phosphorus levels in starch (5–10 g sample size) were determined by the procedure of Smith and Caruso, *Method of Carbohydrate Chemistry*, 4:42 (1964). Unless otherwise stated, the phosphorus levels included naturally occurring phosphate in starch plus that esterified to starch.

The pasting behavior of starch was examined in a Brabender Viscograph-E (C. W. Brabender Instruments, Hackensack, N.J.) at 700 cm·g and 75 rpm. An aqueous slurry of starch (8%, dry basis) was heated at the rate of 1.5° C./min from 30°–95° C., maintained at 95° C. for 30 min, cooled to 50° C., and held at 50° C. for 30 min (Mazurs et al 1957, Tipples 1980). The pasting curves were run twice with good reproducibility.

Starch solubility in dimethyl sulfoxide was done by mixing starch (0.5 g) with 90% DMSO (100 ml) at 55° C. while shaking in a water bath (Libby et al 1970). After 30 min, insoluble starch was recovered by centrifuging (8,000× g, 15 min), the supernatant decanted and the sedimented starch washed with ethanol (2×100 ml) followed by drying at 40° C. The dried residue was weighed to determine insolubility in DMSO.

X-ray diffraction of starch was done on samples stored at 23° C. and 95% relative humidity for 24 h. X-ray diffractograms were obtained with a Philips (Model 42273) x-ray diffractometer (Philips, Mahwah, N.J.) operated at 35 KV and 20 mA. X-ray diffraction patterns of starch were taken with Cu/Ni foil filtered, $K_\alpha$ radiation. The samples were scanned through 2 θ (diffraction angle) range of 5°–35° at 2°×2 θ per min. A step interval of 0.01° θ and a count time of 1 sec were used.

Scanning electron micrographs (SEM) were taken with a Perkin-Elmer Etec-Autoscan U-1 microscope at an accelerating potential of 20 kv. The starch samples were sprinkled onto double-sided adhesive tape on top of specimen stubs, and then coated with gold.

Determination of RS by the AOAC Method at 100° C. (RS-AOAC)

RS was determined by an official method to determine dietary fiber (AOAC 1995). This technique is illustrated in FIG. 1. Starch (1 g) was dispersed in 40 ml of 0.05M MES-TRIS buffer solution, pH 8.2 in 400 ml tall-form beakers, and Termamyl α-amylase solution (50 μL, 489 U) was added while stirring at low speed. The beaker was covered with aluminum foil and placed in a waterbath at 100° C. for 30 min with continuous agitation. After cooling to 60° C., protease (100 1l) was added and the mixture incubated for 30 min with continuous agitation. The solution was adjusted to pH 4.0–4.7 by adding 5 ml of 0.561M NaOH solution, and amyloglucosidase solution (300 μl) was added. After incubating for 30 min, the digest was cooled to room temperature, and filtered on a tared sintered glass crucible (Porosity No. 2) over a dried bed of celite (1.0 g) as filter aid. The insoluble residue was washed with distilled water (2×15 ml), 78% ethanol, absolute ethanol, and acetone. The crucibles with the residue were dried overnight in a forced draft oven at 105° C., cooled to room temperature and weighed after cooling to room temperature in a desiccator over anhydrous calcium sulfate. RS was the insoluble residue expressed as the percentage of starch on a dry basis.

Determination of RS by Pig Pancreatic α-Amylase at 37° C. (RS-PPA)

The following is a modification of the method published by Englyst (1982), which is referred to as RS (PPA). This method is schematically illustrated in FIG. 2.

Starch (0.25 g) was added to 0.1M (pH 6.9) phosphate buffer solution (25 ml) containing porcine pancreatic α-amylase (PPA) (1.0870 g) in a screw-cap centrifuge tube (50 ml capacity, 28.5×114.3 mm, Nalgene, Cat. No.3139-0050). The level of the PPA was equivalent to 100,000 U of enzyme/g of starch. The reaction mixture was incubated at 37° C. for 16 h under vigorous stirring with a magnetic stir bar (3×12.7 mm). The digest was cooled, centrifuged (3,000×g for 10 min) and an aliquot (0.5 ml) of the clear supernatant was incubated at 60° C. for 60 min with 9.5 ml of amyloglucosidase solution, which had been previously prepared by dilution of the supplied reagent with 20 volumes of 0.1M sodium acetate buffer (pH4.0). After glucoamylase digestion, the sample was centrifuged (3,000×g for 10 min) and an aliquot (0.1 ml) of the supernatant was mixed with water (1.9 ml) and Reagent I (a mixture of NADP and ATP in 3.2M ammonium sulfate solution, pH 7.6, 1.0 ml) of the glucose assay kit for 3 min at 25° C. Then, reagent II (a mixture of hexokinase and glucose-6-phosphate dehydrogenase in 3.2M ammonium sulfate, 0.02 ml) of the assay kit was added, and after 15 min the absorbance of the solution was measured at 340 nm. In this assay, glucose is converted to glucose -6-phosphate (G-6-P) in the presence of excess hexokinase (HK) and adenosine 5-triphosphate (ATP). G-6-P then is oxidized by nicotinamide-adenine dinucleotide phosphate (NADP) to gluconate-6-phosphate with the formation of reduced nicotinamide-adenine dinucleotide phosphate (NADPH). The amount of NADPH formed in the reaction, measured by absorbance at 340 nm, is stoichiometric to the amount of D-glucose. Absorbance at 340 nm was corrected for the blank, and the glucose converted to starch (1 g glucose equals 0.9 g starch). The blank sample was prepared with the same enzyme digestion procedure without starch.

To determine digestibility of starch after cooking, starch (0.25 g) was mixed with water (5 ml) in a screw-capped Nalgene centrifuge tube (50 ml). After tightening the screw cap the sealed tube was placed in a boiling water bath for 30 min, and 0.125 M (pH 6.9) phosphate buffer (10 ml) was added immediately to the hot mixture. When the mixture reached 37° C., a solution of porcine pancreatic-α-amylase (1.0870 g, 25,000 U) in 0.125M (pH 6.9) phosphate buffer (10 ml) was added, and the digest was stirred vigorously for 16 h at 37° C. Other digestions were done with 50,000, 10,000 and 1,000 U/g of starch. Each digest was centrifuged, and an aliquot (0.5 ml) of the supernatant was digested with glucoamylase as described above. The glucose released was determined by the Boehringer-Mannheim Kit, and undigested starch was determined by difference.

Scanning electron micrographs (SEM) were taken of the resistant residues from some of the cooked starches. The residues were isolated by centrifugation, washed with water, then air dried. The samples were mounted on stubs, coated with a thin layer of gold, then viewed in the microscope.

Example 1

A. Phosphorylation of Starch in Aqueous Slurry with STMP/STPP or STMP

Wheat starch (50 g, dry basis), water (70 ml), sodium trimetaphosphate (5.94 g, 11.88%, based on starch ["bos"]), with or without STPP (0.06 g, 0.12%, bos) and sodium sulfate (5 g, 10%, bos) were placed in a round bottom flask, and the mixture was adjusted to pH 11.5 by adding 1.0M sodium hydroxide (~25 ml). The slurry was stirred continuously, warmed to 45° C., and held at 45° C. for 3 h. After that time, the pH of the slurry was found to decline by ~0.2–0.3 pH units. The slurry was adjusted to pH 6.5 by adding 1.0M hydrochloric acid, usually less than ~20 ml, and the starch was collected by centrifugation and washed with water (4×100 ml) and dried at 40° C. The phosphorylated starch contained 0.38% phosphorus, and its yield (and that of all other phosphorylated starches), was greater than ~99%. The RS level determined by the AOAC method was 76%; this product is referred to as $RS_4$-wheat-76 (Table I). In a similar manner, wheat starch reacted with with 3.96% STMP and 0.04% STPP gave an AOAC RS level of 39%, and is referred to as $RS_4$-wheat-39. Additional tests were conducted using varying ratios of STMP and STPP (Table II) and varying reaction conditions (Table III).

Corn, potato, and rice, and mung bean starches were also phosphorylated in the same manner with a total of 12%, 14%, 9% and 12% of a 99:1 mixture of STMP/STPP (bos), respectively, to give 100% yields of $RS_4$-corn-58, $RS_4$-potato-73, and $RS_4$-rice-5, and $RS_4$-mung bean-98 (i.e., AOAC RS levels of 58%, 73%, 5% and 98%, respectively).

B. Other Methods to Phosphorylate Starch and Cross-Link Starch

Several other methods were devised to produce resistant starch by phosphorylation.

1. Phosphorylation with a temperature gradient in the presence of 10% (bos) sodium sulfate. Wheat starch (50 g, dry basis), water (70 ml), sodium trimetaphosphate (6.93 g, 11.86%, bos), with or without STPP (0.07 g, 0.014%, bos) and sodium sulfate (5 g, 10%, bos) were placed in a round bottom flask and the mixture adjusted to pH 11.5 by adding 1.0M sodium hydroxide (~25 ml). The slurry was stirred continuously and heated at the average rate of 1.1° C./min from 25°–70° C., then held at 75° C. for 20 min. After cooling to room temperature, the slurry was adjusted to pH 6.5 by adding 1.0M hydrochloric acid (usually less than ~20 ml), and the starch was collected by centrifugation, washed with water (4×100 ml) and dried at 40° C.

2. Phosphorylation at a moderate temperature with a pH gradient in the presence of 10% sodium sulfate. Wheat starch (50 g, dry basis), water (70 ml), and sodium sulfate (5 g, 10% bos) were placed in a round bottom flask with two levels (12, 16% bos) of STMP/STPP mixture (99:1). Each mixture was heated to 45° C. and adjusted to pH 11.5 by adding 1.0M sodium hydroxide (~25 ml). The slurry was stirred for 5 min., then 10 ml of 2M sodium hydroxide was added. The addition of sodium hydroxide was repeated two more times at 5 min. intervals to give a final pH of 12.3. The slurry was continuously stirred another 15 min. total reaction time 30 min. The slurry was then adjusted to pH of 6.5 by adding 1.0M hydrochloric acid and the starch was isolated as previously described.

3. Phosphorylation at high temperature (70° C.) in the presence of 20% sodium sulfate. Wheat starch (50 g, dry basis), water (70 ml),) and a high level of sodium sulfate (10 g, 20%, bos) were placed in a round bottom flask at 25° C., and the mixture adjusted to pH 11.5 by adding 1.0M sodium hydroxide (~25 ml). The slurry was stirred continuously, heated to 70° C., and then a mixture of sodium trimetaphosphate (4.96 g, 9.9%, bos), STPP (0.05 g, 0.1%, bos) was added. After stirring at 70° C. for 30 min, the mixture was cooled to room temperature. The slurry was adjusted to pH 6.5 by adding 1.0M hydrochloric acid (usually less than ~20 ml), and the starch was isolated as previously described.

4. Phosphorylating at room temperature for 5 h. in the presence of 10% sodium sulfate. Starch was phosphorylated in a slurry reaction at room temperature for a somewhat longer reaction time (5 h. vs 3 h.), reduced reaction temperature (25° C. vs 45° C.), and increased level of STMP/STPP mixture (14% vs 12%, bos) to produce $RS_4$-wheat-76. Wheat starch (50 g, dry basis), water (70 ml), sodium trimetaphosphate (6.93 g, 13.86%, bos), STPP (0.07 g, 0.14%, bos) and sodium sulfate (5 g, 10%, bos) were placed in a round bottom flask and the mixture adjusted to pH 11.5 by adding 1.0M sodium hydroxide (~25 ml). The slurry was continuously stirred and held at room temperature for 5h, after which time the reaction mixture was neutralized and the starch isolated as before.

5. Phosphorylation with a high level of STMP/STPP at medium temperature (45° C.) with 10 % sodium sulfate. Wheat starch (50 g, dry basis), water (70 ml), a high level of STMP (9.4 g, 19%, bos) and STPP (0.1 g, 0.19%) and sodium sulfate (5 g, 10%) were placed in a round bottom flask and the mixture adjusted to pH 11.5 by adding 1.0M sodium hydroxide (~25 ml). The slurry was stirred continuously, warmed to 45° C., then held at 45° C. for 1 h, after which time the reaction mixture was neutralized and the starch isolated as before.

6. Phosphorylation at room temperature and high pH without the presence of sodium sulfate. Wheat starch (50 g, dry basis), water (70 ml), a high level of sodium trimetaphosphate (6.94 g, 11.88%, bos), STPP (0.06 g, 0.12%, bos) were placed in a round bottom flask at 25° C. and stirred for 5 min. Then, the mixture was adjusted to pH 12.0 by adding 1.0M sodium hydroxide (~45 ml). The mixture was stirred continuously at room temperature for 12 h. After the reaction, the starch slurry was neutralized to pH 6.5 with 1M HCl (20±1.5 ml), and the starch isolated in the same manner as before.

7. Cross-linking with epichlorohydrin. Wheat starch (50 g, dry basis), water (70 ml) and sodium sulfate (7.5 g) were stirred together and the mixture adjusted to pH 11.5 by adding 1.0M sodium hydroxide. To the slurry were added epichlorohydrin (0.15, 0.5 and 1.0 g) and the reaction was allowed to proceed 15 h at 25° C. The reaction mixture was adjusted to pH 6.5 with mineral acid, and the starch isolated as before.

8. Phosphorylation using semi-moist reaction conditions. In a typical reaction, wheat starch (50 g dry basis) was stirred in water (70 mL) at 25° C. containing 5 parts of sodium sulfate (based on starch) and 2 parts of a 99/1 (w/w) mixture of STMP/STPP. The slurry was adjusted to pH 11.5 by adding 1M sodium hydroxide, then stirred 1 h, then dried at 100° C. to less than 15% moisture. The dried mixture was heated 2 h at 130° C. in a forced convection oven. After cooling to room temperature, the reaction mixture was dispersed in distilled water (100 ml), and the pH of the dispersion was adjusted to pH 6.5 by adding 1M hydrochloric acid. The modified starch was collected by centrifugation, washed with water (100 ml×4), then dried.

9. Phosphorylation with phosphoryl chloride ($POCl_3$). Cross-linking of starch with $POCl_3$ was done essentially by the method of Felton and Schopmeyer (1943). Wheat starch (50 g, dry basis) was slurried for 1 h at 25° C. in water (70 ml), and sodium sulfate 1 g (2.0%, bos) was added followed by 1M sodium hydroxide until the slurry reached pH 11.0. Phosphoryl chloride 0.1% (w/w) was injected with a microliter syringe into the starch slurry, and after 1 h the slurry was adjusted to pH 5.5 with 1M hydrochloric acid. The starch was recovered by centrifuging (15,000 g, 10 min), washing with water (4×100 ml), and drying at 40° C. Another cross-linking reaction was done at 0.1% $POCl_3$ in the same manner except at a high pH (12) and high sodium sulfate level (15%). A second series of cross-linking reactions were done in slurry reactions with 1.0 and 2.0% phosphoryl chloride (bos), in the presence of 15% sodium sulfate (bos). The reagent was added incrementally (0.1 ml) while maintaining pH at 11.5±0.3 by adding 1M sodium hydroxide dropwise. The starches were isolated as before, and the levels of phosphorylation and resistant starch were measured in the product.

Table I sets forth a comparison of RS levels observed with modified starches using different cross-linkers. Phosphoryl chloride and epichlorohydrin at 0.1 and 0.3%, respectively, give little resistant starch, whereas at 2%, they give 75–85% resistant starch. The STMP/STPP reagent, when used at a level sufficient to give 0.38% residual phosphorus in a 3 h reaction, also gives a high level of resistant starch. The use of STMP/STPP is preferred because those reagents are innocuous and are easily handled solids, whereas the other reagents are irritating, noxious and/or mutagenic liquids. Table II sets forth data regarding cross-linking using various ratios of STMP/STPP or STMP alone; Table III gives results using differing reaction conditions with STMP/STPP in a starch slurry, and Table IV gives results with reactions done on semi-moist starch.

Table V gives RS levels of two commercially available products (CrystaLean and Novelose) before and after cooking, as compared with certain modified starch products of the invention. Table VI sets forth the effect of α-amylase level on resistant starches in accordance with the invention, versus the commercial starches. Table VII gives AOAC RS levels for the commercial starches and those of the invention as well as a comparison of the solubilities and their appearances in SEM photomicrographs.

TABLE I

Comparison of Resistant Starch[a] Level in Cross-Linked Wheat Starches Prepared by Different Reagents.

| Reagent | Cross-Linking Reaction Conditions | | | | | Product | |
|---|---|---|---|---|---|---|---|
| | Cross-linking Agent (%, bos) | pH | Temperature (°C.) | Time (h) | Sodium Sulfate (bos, %) | Residual Phosphorus (%) | RS level (%) |
| STMP/STPP[b] | 12 (11.90/0.1) | 11.5 | 45 | 3 | 10 | 0.38 | 75.6 ± 1.5 |
| POCl[c]$_3$ | 0.1 | 11.0 | 25 | 1 | 2 | 0.03 | 0.4 ± 0.3 |
| POCl$_3$ | 0.1 | 12.0 | 25 | 1 | 15 | 0.03 | 0.7 ± 0.2 |
| POCl$_3$ | 1.0 | 11.5 | 25 | 1 | 15 | 0.17 | 52.7 ± 6.6 |
| POCl$_3$ | 2.0 | 11.5 | 25 | 1 | 15 | 0.28 | 85.6 ± 4.5 |
| Epichlorohydrin | 0.3 | 11.5 | 25 | 1 | 15 | ND[d] | 1.8 ± 1.0 |
| Epichlorohydrin | 1.0 | 11.5 | 25 | 1 | 15 | ND[d] | 57.4 ± 3.9 |
| Epichlorohydrin | 2.0 | 11.5 | 25 | 1 | 15 | ND[d] | 75.8 ± 0.3 |

[a]Resistant starch (RS) level measured by the AOAC method using a thermal stable α-amylose at 100° C. for 30 min.
[b]STMP = sodium trimetaphosphate and STPP = sodium tripolyphosphate.
[c]POCl$_3$ = phosphoryl chloride.
[d]ND = not determined.

TABLE II

Levels of Phosphorus Add-On and Resistant Starch (AOAC) in Distarch Phosphate RS$_4$ Prepared with Different Ratios of STMP/STPP[a]

| STMP/STPP | Residual P (9%) | RS (%) by AOAC Method |
|---|---|---|
| 1/99 | 0.04 | 1.0 ± 0.1 |
| 25/75 | 0.15 | 21.6 ± 2.1 |
| 50/50 | 0.25 | 56.6 ± 1.0 |
| 75/25 | 0.34 | 63.7 ± 1.0 |
| 99/1 | 0.38 | 75.6 ± 1.5 |
| 100/0 | 0.38 | 75.6 ± 1.8 |

[a]All reactions done on wheat starch in aqueous slurry (40% starch) with 10 parts (bos) of a mixture of sodium trimetaphosphate (STMP)/sodium tripolyphosphate (STPP) at pH 11.5 and 45° C. for 3 h in the presence of 10% sodium sulfate (bos).

TABLE III

Preparation of Distarch Phosphate RS$_4$ In a Starch Slurry Using Various Reaction Conditions

| Reaction Number | Reaction Condition[a] | | | | | Product | |
|---|---|---|---|---|---|---|---|
| | pH | Temp °C. | Na$_2$SO$_4$ | Total STMP + STPP | Time h | Residual Phosphorus % | RS (%) by AOAC Method |
| 1 | 11.5 | 45 | 10 | 12 | 3 | 0.38 | 75.6 ± 1.5 |
| 1a | 11.5 | 45 | 10 (NaCl) | 12 | 3 | 0.70 | 99.6 ± 1.0 |
| 2 | 11.5 | 25→70[b] | 10 | 14 | 1 | 0.38 | 85.9 ± 1.4 |
| 3 | 11.5→12.3[c] | 70° | 20 | 12 | 0.5 | 0.30 | 81.2 ± 3.3 |
| 4 | 11.5 | 25° | 10 | 14 | 5 | 0.38 | 83.3 ± 0.3 |
| 5 | 12.0 | 25° | 0 | 10 | 12 | 0.38 | 85.7 ± 1.9 |
| 6 | 11.5 | 45 | 10 | 19 | 1 | 0.38 | 85.8 ± 2.3 |

[a]All reactions done on wheat starch in aqueous slurry (40% starch solids) with different levels of a 99/1 (w/w) mixture of STMP/STPP. Concentrations (wt %) of sodium sulfate and total STMP & STPP are bos.
[b]Temperature during the reaction began at 25° C. and was ramped to a final temperature of 70° C. at a rate of 1.1° C./min. Total reaction time was 1 h.
[c]The reaction began at pH 11.5 and was ramped to a final pH of 12.3 by three incremental additions of 10 ml of 1 M sodium hydroxide at 5 min. intervals. Total reaction time was 30 min.

TABLE IV

Preparation of Distarch Phosphate RS$_4$ by Reaction of Wheat Starch in Semi-Solid State with STMP/STPP

| STMP/STPP | | | RS (5) | |
|---|---|---|---|---|
| Total (%, bos) | Ratio (w/w) | Residual P (%) | RS (PPA method, after cooking) | RS (AOAC method) |
| 14 | 1:99 | 0.20 | 12.2 | 0.6 ± 0.3 |
| 16 | 1:99 | 0.20 | 12.4 | 0.8 ± 0.1 |
| 2 | 99:1 | 0.22 | 14.0 | 40.3 ± 2.8 |
| 4 | 99:1 | 0.43 | 15.6 | 87.8 ± 4.5 |

TABLE V

RS Levels of Distarch Phosphates with ~0.4% Phosphorus Level. RS Determined In Vitro by Pancreatic α-Amylase Digestion at 37° C Compared to Bacterial α-Amylase at 100° C.

| Starch Products | Pig-Pancreatic α-Amylase (RS-PPA)[a] Before cooking | Pig-Pancreatic α-Amylase (RS-PPA)[a] After cooking | Bacterial α-Amylase (RS-AOAC) |
|---|---|---|---|
| Commercial Samples of $RS_3$ Resistant Starches | | | |
| CrystaLean | 8.9 ± 1.2 | 20.6 ± 0.5 | 11.3 ± 0.7 |
| Novelose | 51.3 ± 0.3 | 43.8 ± 0.9 | 32.6 ± 0.6 |
| Distarch Phosphate $RS_4$ Resistant Starches and Parent Starches | | | |
| Wheat starch | | | |
| Prime | 6.64 ± 1.2 | 0 | 0.3 ± 0.1 |
| Distarch Phosphate[c] | 14.8 ± 0.3 | 8.1 ± 1.6 | 75.6 ± 1.5 |
| Small-granule wheat | | | |
| Prime | 24.5 ± 6.1 | 0 | 0.8 ± 0.3 |
| Distarch Phosphate[c] | 31.5 ± 6.7 | 0 | 19.8 ± 5.2 |
| Corn | | | |
| Prime | 4.5 ± 0.9 | 0 | 0.5 ± 0.1 |
| Distarch Phosphate[c] | 38.2 ± 0.5 | 10.1 ± 1.6 | 57.8 ± 1.9 |
| Potato | | | |
| Prime | 69.7 ± 0.5 | 0 | 0 |
| Distarch Phosphate[c] | 78.8 ± 0.4 | 9.1 ± 0.7 | 72.8 ± 0.8 |
| Mung Bean | | | |
| Prime | — | 0 | 0.8 ± 0.1 |
| Distarch Phosphate[c] | — | 14.7 | 97.5 ± 0.3 |
| Rice | | | |
| Prime | 72.9 ± 0.2 | 0 | 0.9 ± 0.3 |
| Distarch Phosphate[d] | 81.9 ± 0.2 | 11.1 ± 0.3 | 84.6 ± 4.2 |
| Tapioca | | | |
| Prime | 38.4 ± 1.5 | 0 | 0.2 ± 0.1 |
| Distarch Phosphate[d] | 58.7 ± 4.5 | 0 | 31 ± 1.0 |
| Oat | | | |
| Prime | 15.1 ± 1.6 | 0 | 0.6 ± 0.1 |
| Distarch Phosphate[d] | 22.3 ± 0.1 | 0 | 9.9 ± 2.4 |

[a]Resistant starch measured by PPA digestion at 37° C. for 16 h using $10^5$ units of PPA/g starch. The resistant starch termed RS (PPA).
[b]Resistant starch measured by AOAC method for dietary fiber using thermally stable α-amylase at 100° C. for 30 min. This resistant starch is termed RS (AOAC).
[c]Cross-linked in slurry by moderately rapid reaction conditions given by Reaction 1 in Table III.
[d]Cross-linked in slurry by long time reaction conditions given by Reaction 5 in Table III.

TABLE VI

Effect of Level of Porcine Pancreatic α-Amylase on Level of Resistant Starch Measured at 37° C. and 16 h After Starches Were Heated 30 min in Boiling Water.

| | Level of Enzyme (U/g of starch) | | | |
|---|---|---|---|---|
| | 100,000 | 50,000 | 10,000 | 1,000 |
| Wheat starch | | | | |
| Prime- | 0 | 0 | 0 | 0 |
| Distarch Phosphate[a] | 9.0 | 7.3 | 7.0 | 37.7 |
| Corn starch | | | | |
| Prime | 0 | 0 | 0 | 0 |
| Distarch Phosphate[a] | 9.8 | 10.2 | 11.3 | 32.7 |
| Rice | | | | |
| Prime | 0 | 0 | 0 | 0 |
| Distarch Phosphate[a] | 5.8 | 8.2 | 15.6 | 25.0 |
| Novelose | 43.8 | 47.5 | 51.9 | 60.8 |
| CrystaLean | 20.6 | 20.6 | 21.8 | 24.3 |

[a]All distarch phosphates contained ~0.4% phosphorus and were prepared by a moderately rapid phosphorylation reaction.

TABLE VII

Resistant Starch Levels (RS, AOAC), Solubilities in Dimethyl Sulfoxide (DMSO) and Phosphorus Contents in Samples of Resistant Starch.

| Sample | RS (AOAC) (%) | DMSO solubility (%) | Residual P (%) | Granule Appearance |
|---|---|---|---|---|
| Commercial Samples of Resistant Starches | | | | |
| Novelose[a] | 32.6 ± 0.6 | 100 ± 1 | 0.03 | Shrunken and fused |
| CrystaLean[b] | 11.3 ± 0.7 | 100 ± 1 | 0.04 | Shrunken smooth ellipsoids |
| New Resistant Starches | | | | |
| Wheat starch | | | | |
| Prime wheat | 0 | 100 ± 1 | 0.06 | Smooth disks & spheres |
| Alkali-extracted | 0 | 100 ± 1 | 0 | Smooth disks & spheres |
| $RS_4$-wheat-39 | 38.8 ± 25.1 | 0 ± 1 | 0.12 | Smooth disks & spheres |
| $RS_4$-wheat-76 | 75.6 ± 1.5 | 0 ± 1 | 0.38 | Smooth disks & spheres |
| Corn starch | | | | |
| Prime corn | 0 | 100 ± 1 | 0.02 | Smooth spheres & polyhedrons |
| Alkali-extracted | 0 | 100 ± 1 | 0 | Smooth spheres & polyhedrons |
| $RS_4$-corn-58 | 57.8 ± 1.9 | 1 ± 1 | 0.39 | Smooth spheres & polyhedrons |
| Potato starch | | | | |
| Prime potato | 0 | 100 ± 1 | 0.07 | Smooth ellipsoids |
| Alkali-extracted | 0 | 100 ± 1 | 0.06 | Smooth ellipsoids |
| $RS_4$-potato-73 | 72.8 ± 0.8 | 1 ± 2 | 0.38 | Smooth ellipsoids |
| Rice starch | | | | |
| Prime rice | 0 | 100 ± 1 | 0.07 | Smooth tiny polygons |
| Alkali-extracted | 0 | 100 ± 1 | 0 | Smooth tiny polygons |
| $RS_4$-rice-5 | 5.4 ± 0.8 | 1 ± 2 | 0.36 | Smooth tiny polygons |
| $RS_4$-rice-85 | 84.6 ± 0.9 | 1 ± 2 | 0.36 | Smooth tiny polygons |

[a]National Starch and Food Company (Bridgewater, NJ).
[b]Opta Food Ingredients, Inc. (Bedford, MA).

Example 2

A. Animal Feeding Tests

All diets contained the same levels of dietary fiber (10%, by weight of finished ration), protein (15%), fat (10%), and cholesterol (0.5%). The diets were complete in nutrients required by weanling hamsters (NRC 1987).

Male Syrian golden hamsters (Sasko Inc., Omaha, Nebr.) were housed individually in suspended mesh-bottomed cages in a controlled environment (23° C., 50% RH). After 1 week on a fiber-free diet, the animals were weighed, and assigned by selective randomization to four groups (10 animals per group; mean weight of 80±6), and fed one of four test diets (Table VIII). All animals were allowed free access to food and water. Feed consumption records were kept and hamsters were weighed weekly.

TABLE VIII

Compositions of Test Diets[a]

| | Diets | | | |
|---|---|---|---|---|
| | Cellulose | Novelose | $RS_4$-wheat 39 | $RS_4$-wheat 76 |
| Components, % | | | | |
| Corn Starch | 56.42 | 41.08 | 41.09 | 55.65 |
| Cellulose | 10.46 | 0.0 | 0.0 | 0.0 |
| Resistant Starch | 0.0 | 25.8 | 25.7 | 11.23 |
| Casein | 17.80 | 17.80 | 17.80 | 17.80 |
| Shortening | 7.86 | 7.86 | 7.86 | 7.86 |
| Other | 7.46 | 7.46 | 7.46 | 7.46 |
| Levels in Finished Ration, % | | | | |
| Protein | 15.0 | 15.0 | 15.0 | 15.0 |
| Fat | 9.9 | 10.0 | 10.0 | 10.0 |
| Total Dietary Fiber | 10.0 | 10.0 | 10.0 | 10.0 |

[a]Includes (%): soybean oil (2), mineral mix (3.5), vitamin mix (1), dl methionine (0.3), choline chloride (0.16), and cholesterol (0.5).

B. Cholesterol Assays After six weeks on test diets, animals were fasted overnight (14 h) and then lightly anesthetized under ether. Blood samples (~1 ml) were collected by cardiac puncture. The blood was placed in a microcentrifuge tube and centrifuged at 10,000×g for 2 min at 10° C., and serum samples were kept at 4° C. until cholesterol analysis. Serum total cholesterol and high density lipoprotein cholesterol levels were analyzed enzymatically using Sigma Diagnostic Kits 352 and 336, respectively. Sigma Diagnostic Cholesterol Reagent measures cholesterol enzymatically and is a modification of the method of Allain et al (1974). In that method, cholesterol esters are hydrolyzed by cholesterol esterase (EC 3.1.1.13) to cholesterol, which is oxidized by cholesterol oxidase (EC 1.1.3.6) to cholesterol-4-en-3-one and hydrogen peroxide. The hydrogen peroxide produced is then coupled with the chromogen, 4-aminoantipyrine (ampyrone) and p-hydroxybenzenesulfonate in the presence of peroxidase (EC 1.11.1.7) to yield quinonimine dye with an absorbance maximum of 500 nm. The intensity of color produced is directly proportional to the total cholesterol concentration in the sample.

The cholesterol reagent, which is a mixture of cholesterol oxidase, cholesterol esterase, peroxidase, 4-aminoantipyrine, p-hydroxybenzensulfonate, buffer and stabilizer, was prepared by dissolving in deionized water. A series of tubes were set up for blank, control and sample. A standard curve of known concentrations (5–20 µg/L) of cholesterol was derived that had a linear regression coefficient ($r^2$=0.999).

The cholesterol reagent (1.0 ml) was warmed to 37° C. and an aliquot (0.1 ml) was transferred to each tube. Next, 0.1 ml of deionized water (blank), control solution or sample was added, and the solution was mixed by gentle inversion. Cuvettes were incubated for 5 min at 37° C., and the absorbance of all tubes read at 500 nm (Sigma diagnostics, Procedure No. 352).

High density lipoprotein (HDL) cholesterol was determined using Kit 352-3. Sigma Diagnostic HDL Cholesterol Reagent is formulated to measure cholesterol concentration of the HDL fraction after very low density lipoprotein and low density lipoproteins (VLDL and LDL) are selectively precipitated, and the HDL fraction collected in the supernatant. In the assay kit, dextran sulfate and magnesium ions precipitate LDL and VLDL, leaving the HDL fraction in solution. The cholesterol content of the HDL fraction is then assayed by the enzymatic method (Sigma Procedure No. 352).

HDL Cholesterol Reagent containing dextran sulfate, magnesium ions, buffer, and stabilizer, was prepared, and a series of tubes were set up. To each tube an aliquot (0.5 ml) of serum or water (blank) was transferred and 50 µL HDL Cholesterol Reagent was added. The contents of the tubes were mixed on a vortex mixer, then allowed to stand at room temperature for 5 min. After another mix with the vortex mixer, the tubes were subjected to centrifugation at 3000×g for 5 min. The cholesterol levels in the supernatant (HDL) were measured with the same method used for total cholesterol. Table IX below gives the serum cholesterol data developed in these tests.

TABLE IX

Serum Cholesterol Levels in Hamsters Consuming a Diet with Cellulose or Resistant Starch

| Cholesterol | Diet[a] | | | |
|---|---|---|---|---|
| (mg/dL) | Cellulose | Novelose | RS4-wheat 39 | RS4-wheat 76 |
| Total | 261 ± 19a | 262 ± 37a | 265 ± 20a | 256 ± 27a |
| HDL[b] | 139 ± 11a | 156 ± 11b | 166 ± 12b | 160 ± 18b |
| VLDL[c] + LDL[d] | 122 | 106 | 99 | 96 |

[a]Within a row, values not sharing common letter are significantly different (p < 0.05).
[b]HDL = high-density lipoprotein.
[c]VLDL = very-low density protein.
[d]LDL = low-density protein.

C. Short-Chain Fatty Acid Level in Cecum

The entire cecum was removed from each animal, weighed, and frozen immediately. Frozen samples were stored at −20° C. until analysis of short chain fatty acids. Cecal short chain fatty acids were extracted as described by Aliza and Zecharia (1993), and analyzed by gas chromatography (GC) by the method of Choi and Jeon (1993). Cecal sample (100 mg) was mixed with distilled water (0.3 ml) in a 10 ml beaker, and the contents transferred to a microcentrifuge tube with the help of an additional 0.3 ml water. The mixture was acidified with 3% metaphosphoric acid (0.1 ml), mixed with ethanol (0.1 ml) containing internal standard (0.1 mM caprylic acid) for 30 sec, and shaken against ether (0.8 ml). Then the mixture was centrifuged (10,000×g 5 for min) at 4° C., and an aliquot (2 µL) of the supernatant was injected into a gas chromatography (Model 5880A, Hewlett-Packard, Palo Alto, Calif.). The SCFA were separated on a 15 m×0.53 mm i.d. Stabilwax-DA capillary column (Resteck Corp., Bellefonte, Pa.) with helium flow of 13 ml/min. The temperature program for the column involved initial holding for 1 min at 100 C., and then heating to 200° C. at 15° C./min and finally holding 200° C. for 13 min. The temperature of both the injection port and detector were 250° C. All GC analyses were performed in duplicate. Samples (2 µl) of supernatant were injected into the GC, and then the peak areas of individual SCFA relative to caprylic acid were compared to the responses of known standards.

Table X gives the SCFA data from those tests.

TABLE X

Effects of Cellulose and Resistant Starch in Diets on in vivo
Concentration[a] of Short Chain Fatty Acids (SCFA)[b] in the Caecum

| | Diets[c] | | | |
|---|---|---|---|---|
| | Cellulose | Novelose | RS4-wheat 39 | RS4-wheat 76 |
| Acetic acid | 16.62 ± 4.94a | 8.77 ± 5.87b | 18.13 ± 5.99a | 17.04 ± 3.81a |
| Propionic acid | 0.48 ± 0.14a | 2.88 ± 1.46b | 0.96 ± 0.57c | 1.22 ± 0.41c |
| Butyric acid | 0.12 ± 0.19a | 2.22 ± 0.93b,c | 1.46 ± 0.88a,c | 2.72 ± 1.72b |
| Total SCFA | 19.78 ± 5.12a | 25.94 ± 9.02a,b | 28.08 ± 6.76b | 30.25 ± 6.97b |

[a]Concentration of acid given in mmol/g of wet tissue.
[b]SCFA = Short chain fatty acids = formic acid, acetic acid, propionic acid; isobutyric acid, and butyric acid.
[c]Within a row, values not sharing a common letter are significantly different ($p < 0.05$).

RESULTS AND DISCUSSION

A. Slurry Reaction Conditions

Distarch phosphate $RS_4$ can be produced in a slurry reaction (typically 35–40% starch solids) with a short or a long reaction time depending on other variables. Short reaction times of less than one hour are sufficient if the pH and temperature are increased to the point just below gelatinization of the starch. Sodium sulfate or sodium chloride is usually used in the short-time process to inhibit gelatinization and to accelerate the phosphorylation reaction. Moreover, high concentrations of STMP/STPP also accelerate the reaction. Generally, an alkaline pH of 11–12 and a temperature of 35°–45° C. are effective in a rapid reaction with 5–20 wt. % sodium sulfate and 5–15 wt. % STMP/STPP bos.

STMP is a more effective phosphorylating agent than STPP as shown by the data in Tables II and IV. Most phosphorylating reactions in this investigation were done at a STMP/STPP ratio of 99/1 (w/w). The level of phosphorylating reagent in a given reaction mixture is chosen so as to keep the residual phosphorus in the product below 0.4–0.5%. That upper limit is regulatory one, and is subject to change. If higher level of phosphorylation is permitted, distarch phosphates with even higher levels of $RS_4$ could be prepared. Moreover, the phosphorylation reactions might then be done with STMP alone without significant change from using a 99/1 mixture of STMP/STPP.

Rapid cross-linking with STMP/STPP can be achieved not only by elevating initial pH and temperature, and by increasing the levels of sodium sulfate and STMP, but also by ramping up the temperature and or pH as the phosphorylation reaction proceeds. With ramping of temperature, for example, reaction times for phosphorylation may be less than one-half hour. However, control of the level of phosphorylation becomes more difficult as the reaction is accelerated.

Wherever environmental concerns occur due to discharge of sodium sulfate or chloride, it is possible to produce distarch phosphate $RS_4$ without adding those salts. In that case the temperature and pH should be reduced to avoid gelatinization, and reaction times with wheat starch become hours instead of minutes. If the starting starch has a higher gelatinization temperature than wheat starch (for example corn and rice starches), then phosphorylating reactions with no sodium sulfate may be conducted at about 10° C. higher temperature with concomitant shorter reaction times.

Table III shows six different slurry reaction conditions used on wheat starch to produce distarch phosphate $RS_4$ all with 0.30–0.38% residual phosphorus level and a RS (AOAC) level of 76–86%. The level of residual phosphorus on the modified starch is easily monitored throughout a reaction period. The level of resistant starch in the distarch phosphate produced at alkaline pH is directly associated with the level of phosphorus added to the starch. The resistance of the distarch phosphate to α-amylase can be monitored in vitro by the two methods described below.

B. Semi-Moist Reaction Conditions

Preparation of modified starch by reaction in semi-moist conditions is not as convenient and is more energy-intensive as compared with slurry reactions. Generally, starch is soaked or sprayed with an aqueous solution of STMP/STPP at alkaline pH. Then, the impregnated starch is dried and heated under strong dehydrating conditions to effect phosphorylation. Next, the reaction mixture is slurried in water and centrifuged to wash away inorganic phosphate salts, and the modified starch is dried and distributed to markets.

C. RS Levels

When the AOAC dietary fiber method was used to measure the $RS_4$ levels in distarch phosphate, the prime starches from wheat, small-granular wheat, corn, potato, rice, tapioca, mung bean and oat gave less than 0.9% $RS_4$ (Table V). The distarch phosphate samples with ~0.4% residual phosphorus prepared from wheat, corn, potato and mung bean starches by a short-time process gave 58–98% $RS_4$ (AOAC), and that from small granular wheat starch gave 20%. Distarch phosphates with 0.4% residual phosphorus prepared from rice starch by a long-time process showed 85% $RS_4$ (AOAC) (Table V), but a distarch-phosphate (P≅0.4%) prepared from the identical rice starch by the same short-time method used for the wheat, corn and potato starches, gave only 5% $RS_4$ (AOAC). Distarch phosphate (P≅0.4%) produced from tapioca and oat starches by a slow reaction process in the absence of sodium sulfate gave 31 and 10%, respectively, of $RS_4$ (AOAC) (Table IV). The two commercial RS products, containing retrograded amylose or the so-called $RS_3$ type resistant starch were also measured for RS. The levels of $RS_3$ (AOAC) measured for Novelose and CrystaLean were 33 and 11%, respectively.

The second method to measure RS in vitro was done at 37° C. with porcine pancreatic alpha-amylase (PPA) (FIG. 2). Englyst et al., *British J Nutrition*, 75:749–755 (1996) have shown that the in vitro levels of starch not digested in diets given to healthy ileostomy subjects agreed with the levels measured by their 1992 in vitro method using porcine pancreatic α-amylase (PPA) at 37° C. The 1992 Englyst et al. method is an update of their earlier method of 1982. The principle of the Englyst method is α-amylase hydrolysis of digestible starch at 37° C. under controlled conditions of level of α-amylase, agitation and digestion time. The low molecular weight products released by α-amylase digestion are then converted by glucoamylase digestion to D-glucose, which is quantitated by glucose oxidase/peroxide. In the modification of the 1982 Englyst method, three changes were made: (1) the level of α-amylase was doubled from 50,000 Sigma units/g sample to 100,000 U/g; (2) rapid stirring with a magnetic stir bar instead of using glass beads and a table-top shaker; and (3) glucose was quantitated by glucose kinase/glucose 6-phosphate dehydrogenase instead of glucose oxidase/peroxide (FIG. 2). Since the sample contained only starch, the initial weight of sample was total starch, and resistant starch was determined by difference.

When measuring resistant starch by the PPA method at 37° C., the condition of the substrate (intrinsic property) must be considered. For example, if starch is present as a food component in a water-rich formula, which is then heated to boiling, such as a gravy or soup, the starch would have undergone cooking in excess water. Thus, to mimic that occurrence of starch in a food, a starch sample should be pre-cooked in boiling water prior to in vitro assay. If a cooked food is cooled and stored under cool conditions, then to mimic that condition, the paste formed from heating the starch sample in hot water should be aged prior to in vitro assay. If the food is not cooled, the hot starch-water mixture should be assayed immediately upon cooling to 37° C. At the other extreme case in a food, starch may be present in a formula low in water and high in table salt and/or sucrose, such as a cracker or cookie, both of which inhibit starch gelatinization. In the latter case, the uncooked starch would be subjected directly to the in vitro assay for resistant starch.

Table V shows the $RS_4$ (PPA) levels in various starch samples after cooking in boiling water for 30 min with immediate assay upon cooling to 37° C. None of the prime starches gave any resistant starch using $10^3$–$10^5$ units of PPA/g starch. The distarch phosphate samples having phosphorus levels of 0.4% made from wheat, corn, potato, mung bean and rice starches gave 8–15% $RS_4$ (PPA) with $10^5$ units/g, and 25–38% with $10^3$ units/g (Table VI). The 25–38% levels of resistant starch measured at an enzyme level of $10^3$ units of PPA/g of starch may be attributed to 15–20% slowly digestible starch, which accompanies the ~10% $RS_4$ (PPA) in the samples. The PPA digestion is done with physical agitation with a large excess of PPA for 16 h at 37° C. Also, the PPA enzyme has a shorter combining site than the bacterial α-amylase enzyme. Thus, the PPA may cut through zones in the granules not accessible to the bacterial enzyme. Possibly the boiling condition could cause just enough swelling to close pores on the granules surface in the modified starches. It is noteworthy that the highest levels of RS-AOAC and RS-PPA were found in the cooked samples of distarch phosphates from mung bean, a starch with an elevated level of amylose. Thus, high amylose starches appear to give more RS when cross-linked than normal starches.

If the starch samples were not cooked in hot water prior to assay for RS, then the prime starches from corn and wheat gave 5–7% $RS_3$ (PPA), oat 15%, small-granule wheat 25%, tapioca 38%, potato 79%, and rice 82%. Raw potato starch granules are well known to resist α-amylase digestion, and that type of resistant starch is called $RS_2$ according to the nomenclature of Englyst. Raw rice starch, and to some extent raw tapioca starch, also showed $RS_2$ type resistance (Table V). $RS_2$ type resistance has been explained by the lack of pore-sized openings on the granules' surface. The raw distarch phosphate samples we prepared showed a 7–33% increase in resistance to PPA, which we attributed to $RS_4$-type resistance (Table V).

The levels of RS (PPA) were measured on the two commercial samples containing $RS_3$ before and after cooking the samples in boiling water. The levels of $RS_3$ (PPA) in the uncooked samples were ~9 and 51%, which increased, respectively, to ~21% and decreased to ~44% upon cooking. Apparently, the boiling of CrystaLean in water increased its level of $RS_3$ because of incomplete retrogradation of the amylose in the product during manufacturing. Retrograded amylose is known to melt above 100° C. and boiling the sample in water created more retrograded amylose.

D. Characteristics of New Resistant Starches

Figure 5:
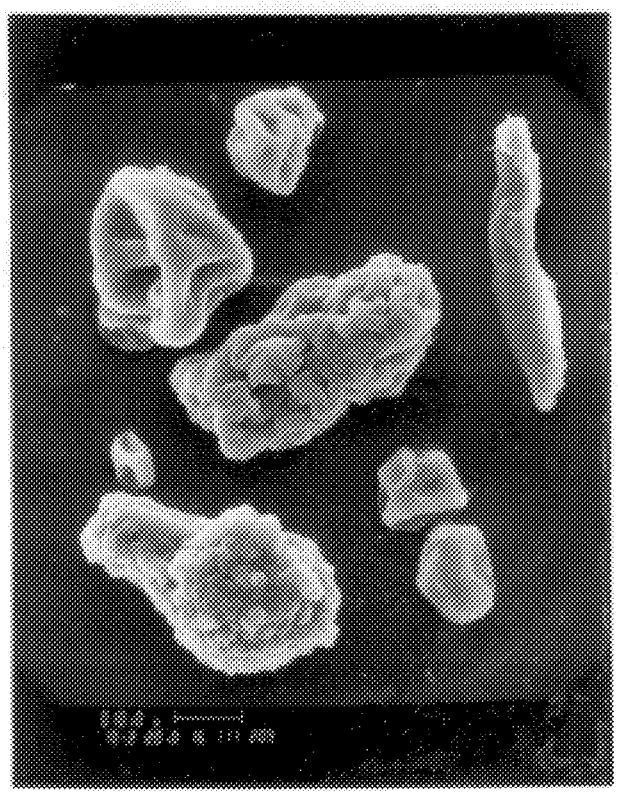
FIG. 5 is an X1000 scanning electromicrograph (SEM) of a commercially available resistant starch sold under the designation Novelose.
Figure 6:
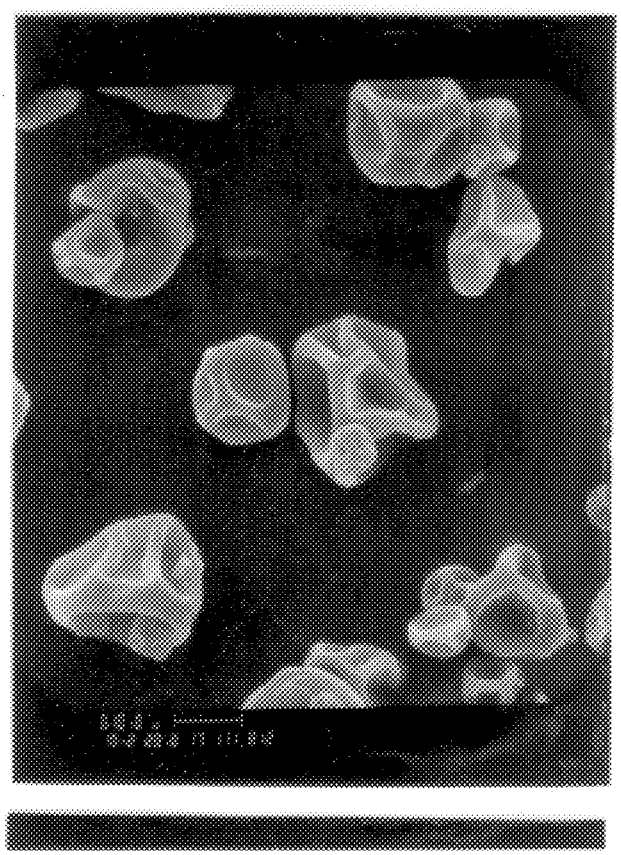
FIG. 6 is an X1000 SEM of a commercially available resistant starch sold under the designation CrystaLean.
Figure 7:
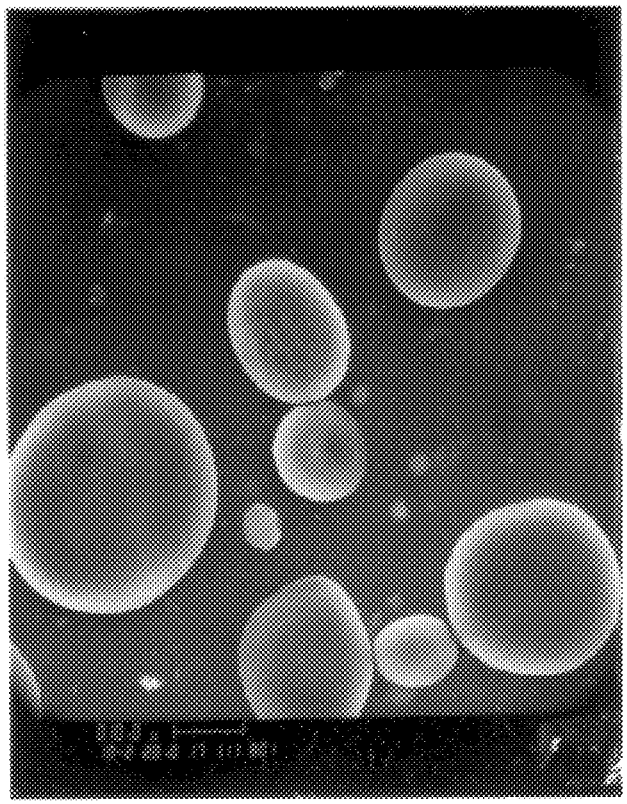
FIG. 7 is an X1000 SEM of prime wheat starch.
Figure 8:
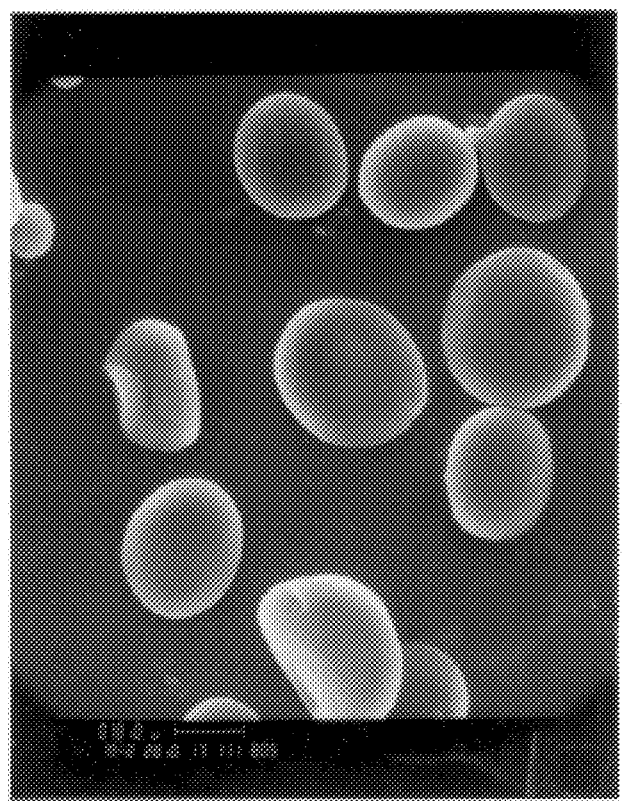
FIG. 8 is an X1000 SEM of a chemically modified starch in accordance with the invention, $RS_4$-wheat-76.
Figure 9:
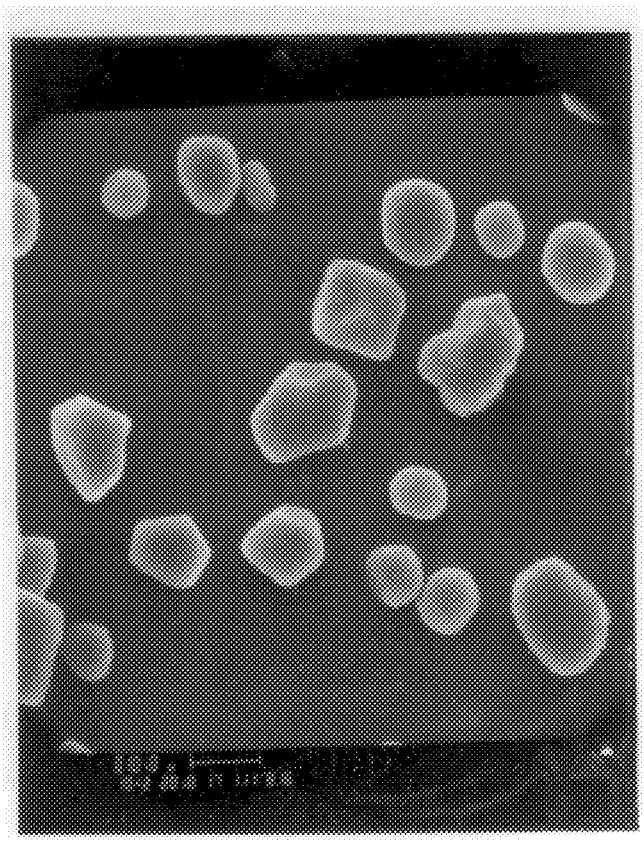
FIG. 9 is an X1000 SEM of prime corn starch.
Figure 10:
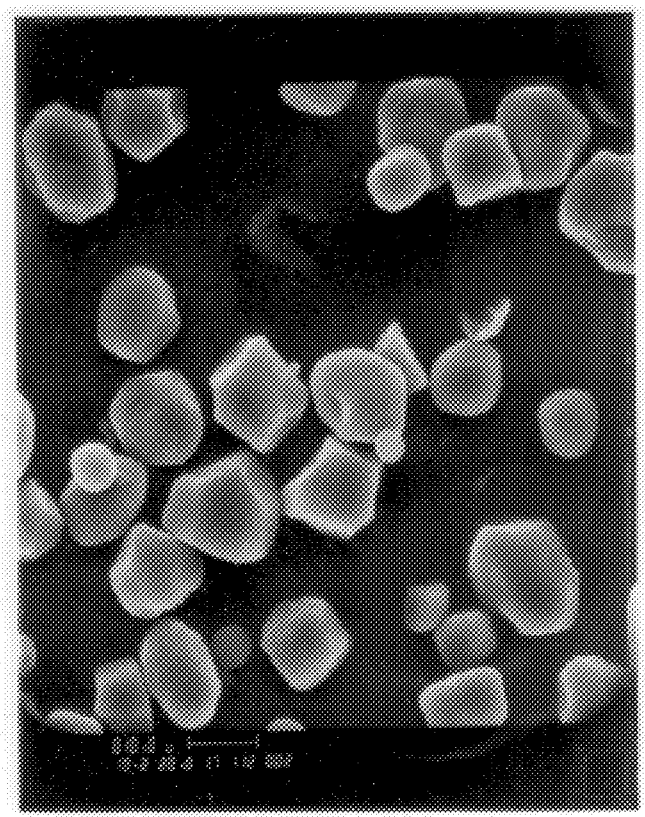
FIG. 10 is an X1000 SEM of a chemically modified starch in accordance with the invention, $RS_4$-corn-58.
Figure 11:
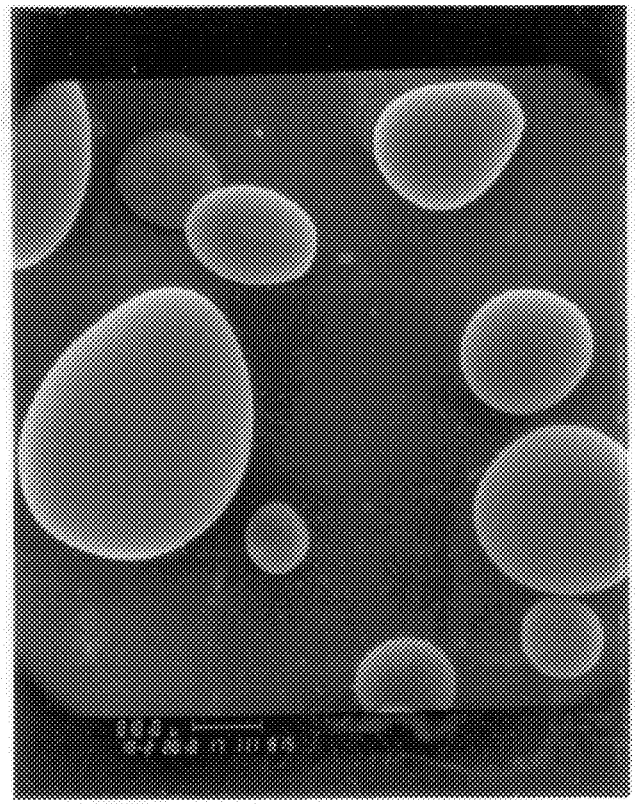
FIG. 11 is an X1000 SEM of prime potato starch.
Figure 12:
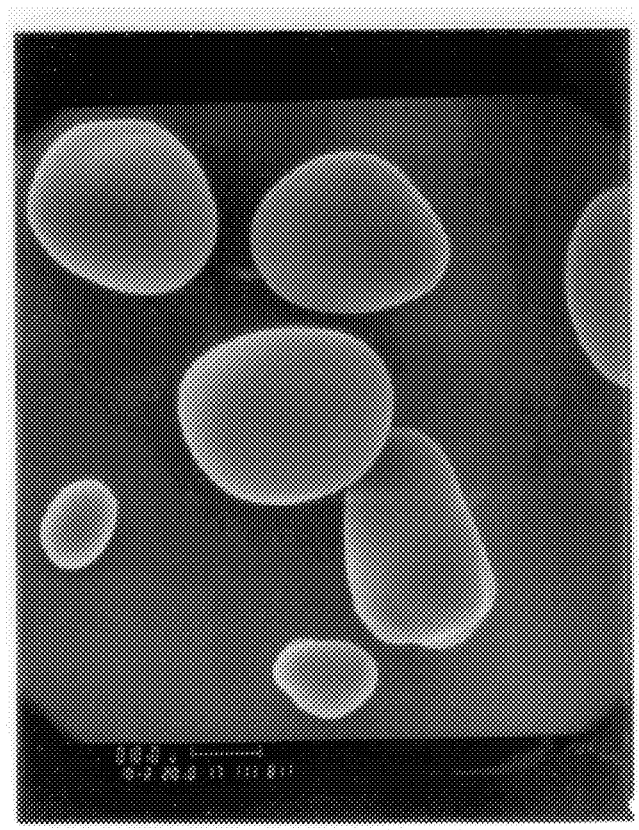
FIG. 12 is an X1000 SEM of a chemically modified starch in accordance with the invention, $RS_4$-potato-73.
Figure 13:
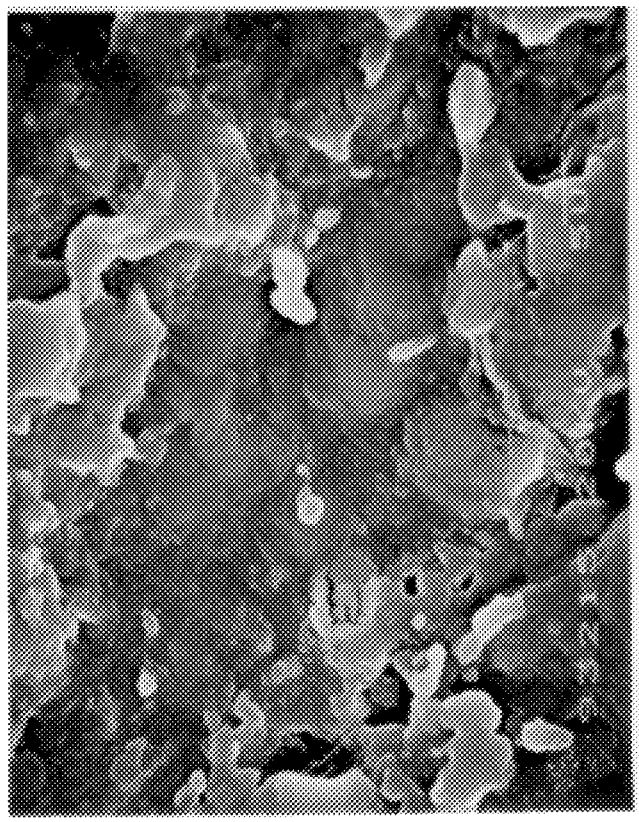
FIG. 13 is an X2000 SEM of the residue of the commercial Novelose starch isolated after boiling the starch in 20 parts of water followed by digestion with $10^5$ U/g of starch using porcine pancreatic α-amylase (PPA) at 37° C. for 16 h. wherein the residue was isolated by centrifugation, washing with ethanol and air drying.
Figure 14:
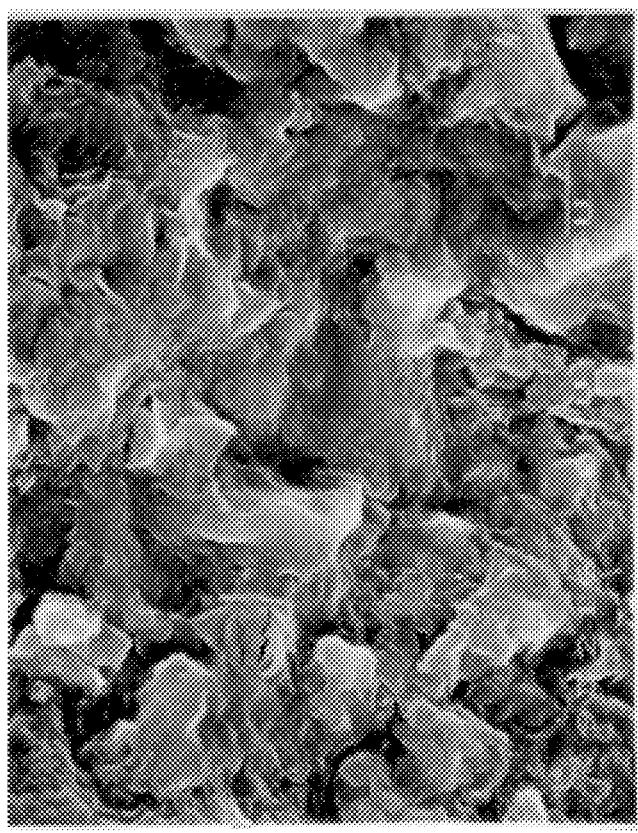
FIG. 14 is an X2000 SEM of the residue of the commercial CrystaLean starch isolated after boiling the starch in 20 parts of water followed by digestion with $10^5$ U/g of starch using porcine pancreatic α-amylase (PPA) at 37° C. for 16 h. wherein the residue was isolated by centrifugation, washing with ethanol and air drying.
Figure 15:
FIG. 15 is an X2000 SEM of the residue of $RS_4$-wheat-76 starch isolated after boiling the starch in 20 parts of water followed by digestion with $10^5$ U/g of starch using porcine pancreatic α-amylase (PPA) at 37° C. for 16 h. wherein the residue was isolated by centrifugation, washing with ethanol and air drying.
Figure 16:
FIG. 16 is an X2000 SEM of the residue of $RS_4$-corn-58 starch isolated after boiling the starch in 20 parts of water followed by digestion with $10^5$ U/g of starch using porcine pancreatic α-amylase (PPA) at 37° C. for 16 h. wherein the residue was isolated by centrifugation, washing with ethanol and air drying.
Figure 17:
FIG. 17 is an X2000 SEM of the residue of $RS_4$-rice-85 starch isolated after boiling the starch in 20 parts of water followed by digestion with $10^5$ U/g of starch using porcine pancreatic α-amylase (PPA) at 37° C. for 16 h. wherein the residue was isolated by centrifugation, washing with ethanol and air drying.
Figure 18:
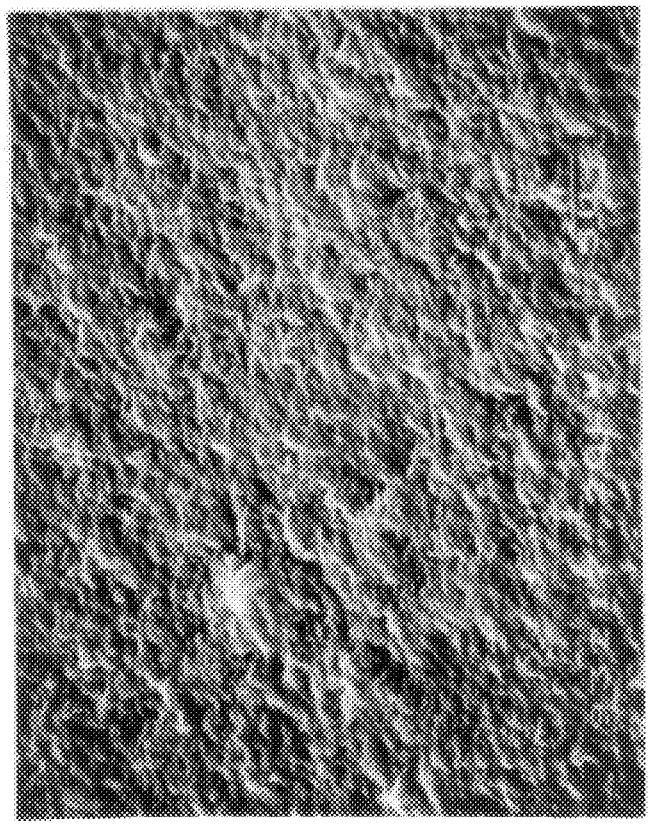
FIG. 18 is an X2000 SEM of the residue of the commercial Novelose starch isolated after boiling the starch in 20 parts of water followed by digestion with $10^3$ U/g of starch using porcine pancreatic α-amylase (PPA) at 37° C. for 16 h. wherein the residue was isolated by centrifugation, washing with ethanol and air drying.
Figure 19:
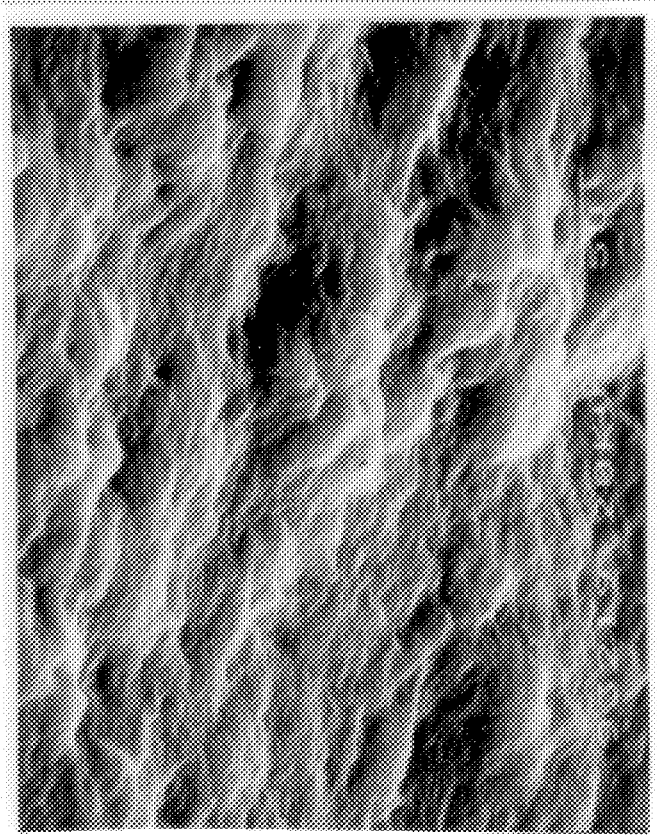
FIG. 19 is an X2000 SEM of the residue of the commercial CrystaLean starch isolated after boiling the starch in 20 parts of water followed by digestion with $10^3$ U/g of starch using porcine pancreatic α-amylase (PPA) at 37° C. for 16 h. wherein the residue was isolated by centrifugation, washing with ethanol and air drying.
Figure 20:
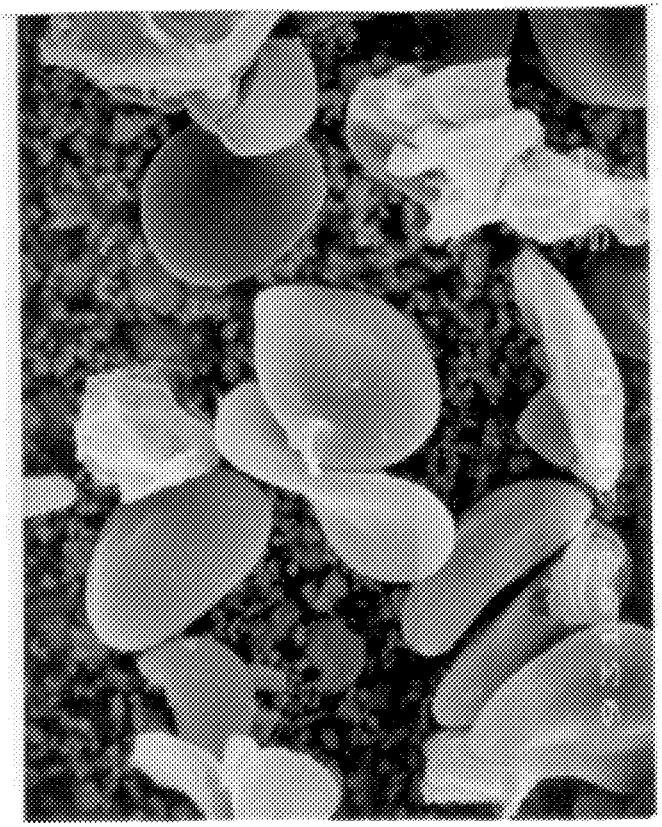
FIG. 20 is an X2000 SEM of the residue of $RS_4$-wheat-76 starch isolated after boiling the starch in 20 parts of water followed by digestion with $10^3$ U/g of starch using porcine pancreatic α-amylase (PPA) at 37° C. for 16 h. wherein the residue was isolated by centrifugation, washing with ethanol and air drying.
Figure 21:
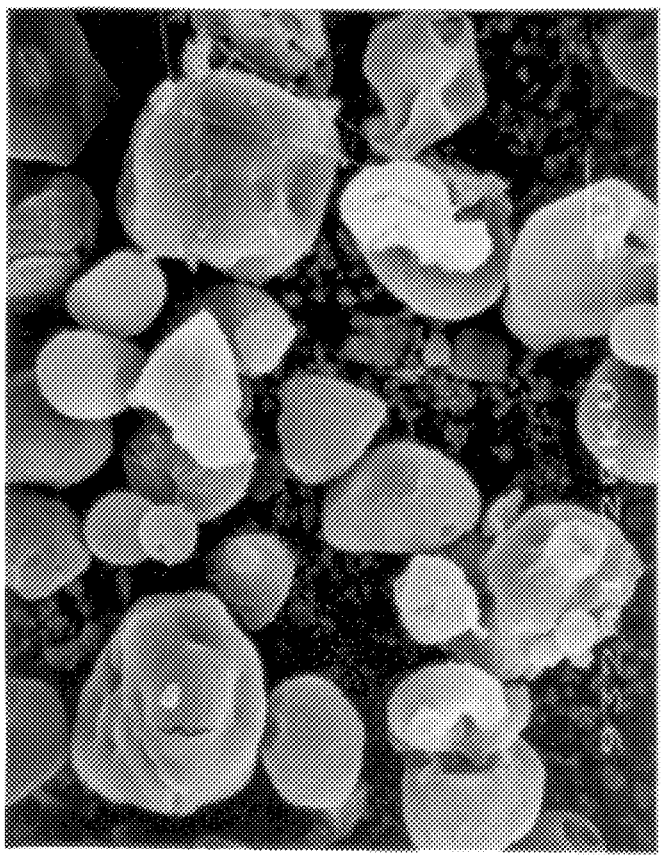
FIG. 21 is an X2000 SEM of the residue of $RS_4$-corn-58 starch isolated after boiling the starch in 20 parts of water followed by digestion with $10^3$ U/g of starch using porcine pancreatic α-amylase (PPA) at 37° C. for 16 h. wherein the residue was isolated by centrifugation, washing with ethanol and air drying.

Scanning electron micrographs showed that distarch phosphate $RS_4$ starches of the invention had the same shapes as their parent starches, with a smooth surface (compare FIGS. 7 and 8, 9 and 10, and 11 and 12). The two commercial resistant starches sometimes showed fused granules and always a shrunken appearance on their surface (FIGS. 5 and 6, Table VII). Moreover, the α-amylase resistant residues isolated after boiling the starches in water followed by digestion with $10^5$ U/g (FIGS. 13–17) and $10^3$ U/g (FIGS. 18–21) of PPA, appeared different in SEM photomicrographs than those of CrystaLean and Novelose. The residues from the $RS_4$ type starches appeared more fibrous than those of CrystaLean and Novelose, which appeared unstructural.

Figure 3B:
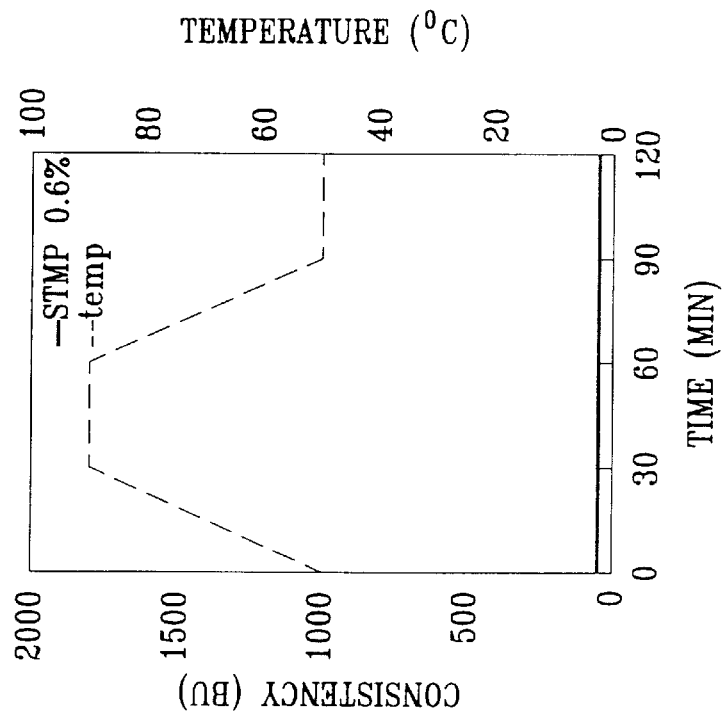
FIG. 3B is a pasting curve (10% starch slurry) of modified starch phosphates made from wheat starch slurry (40%) reacted in the presence of 10% sodium sulfate and a 99/1 (w/w) mixture of STMP/STPP at a total level of 0.6% by weight based on the weight of starch, at pH 11.5 for 3 h at 45° C.
Figure 3A:
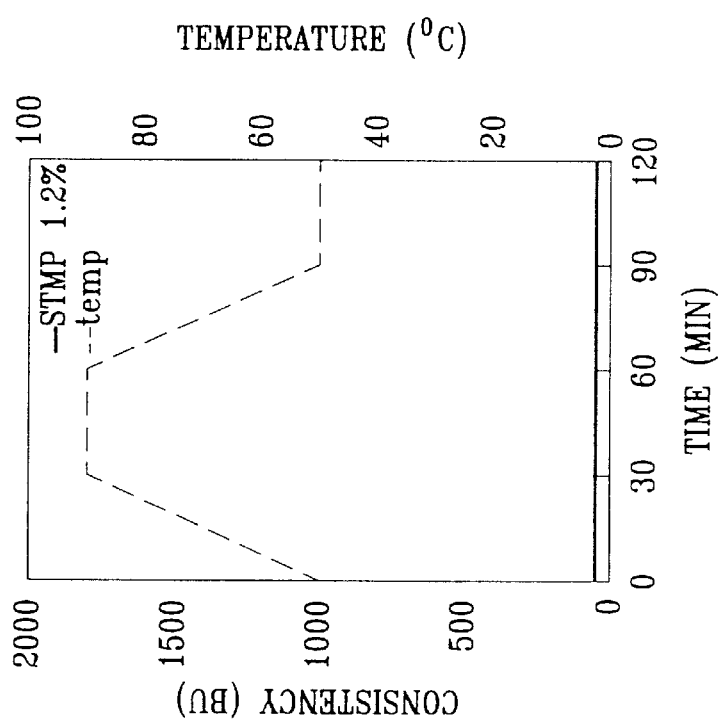
FIG. 3A is a pasting curve (10% starch slurry) of modified starch phosphates made from wheat starch slurry (40%) reacted in the presence of 10% sodium sulfate and a 99/1 (w/w) mixture of STMP/STPP at a total level of 1.2% by weight based on the weight of starch, at pH 11.5 for 3 h at 45° C.

The distarch phosphate $RS_4$ samples contained elevated levels of phosphorus and were practically insoluble in dimethyl sulfoxide, whereas the two commercial $RS_3$ sample contained less than 0.04% phosphorus and were 100% soluble in dimethyl sulfoxide (Table VII). X-ray diffraction analyses showed distarch phosphate $RS_4$ made from cereal and potato starches gave the A and B-polymorphic crystal pattern, respectively. The commercial $RS_3$ sample made from corn starch gave the B-polymorphic x-ray pattern, or an amorphous pattern. FIG. 3 illustrates typical pasting curves for distarch phosphate $RS_4$ substituted with <0.1% phosphorus. The $RS_4$ starches gave pasting curves that did not rise above the baseline.

E. Physiological Response of Hamsters to Distarch Phosphate $RS_4$

Three sources of resistant starch (Table VIII) were fed to growing hamsters and their effects on selected physiological responses were compared to that of cellulose (Tables IX and X). All four diets contained 15.0% protein, 9.9% fat, 10% dietary fiber or 10% RS (AOAC), and 0.5% cholesterol.

Figure 4B:
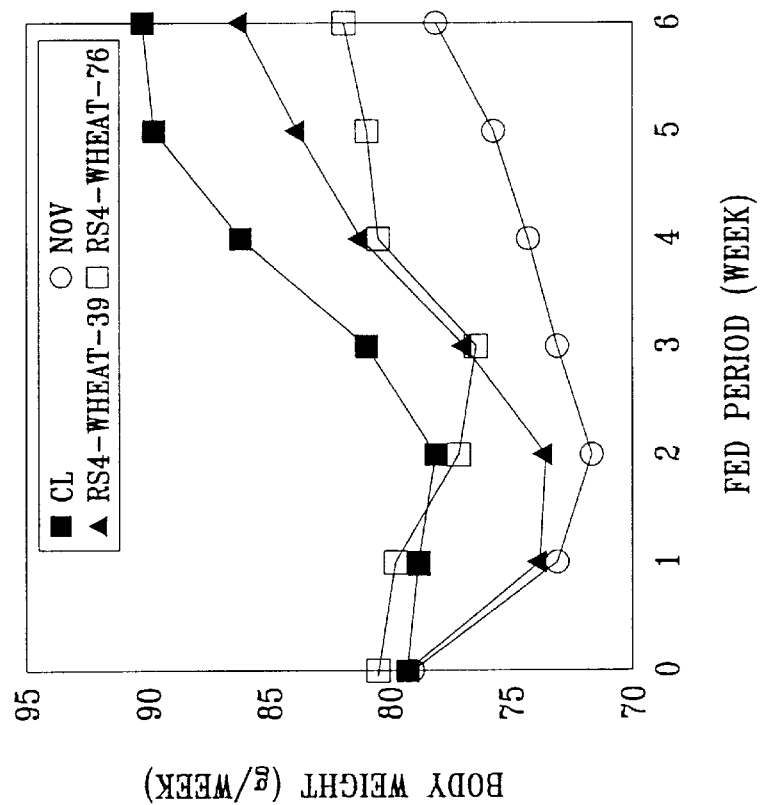
FIG. 4B is a graph of body weight versus time in a hamster test wherein hamsters were fed four test diets, namely cellulose (CL), Novelose (NOV), $RS_4$-wheat-39, and $RS_4$-wheat-76, wherein all diets contained the same level of fiber or resistant starch (AOAC, 10%), protein (15%), fat (10%) and cholesterol (0.5%)
Figure 4A:
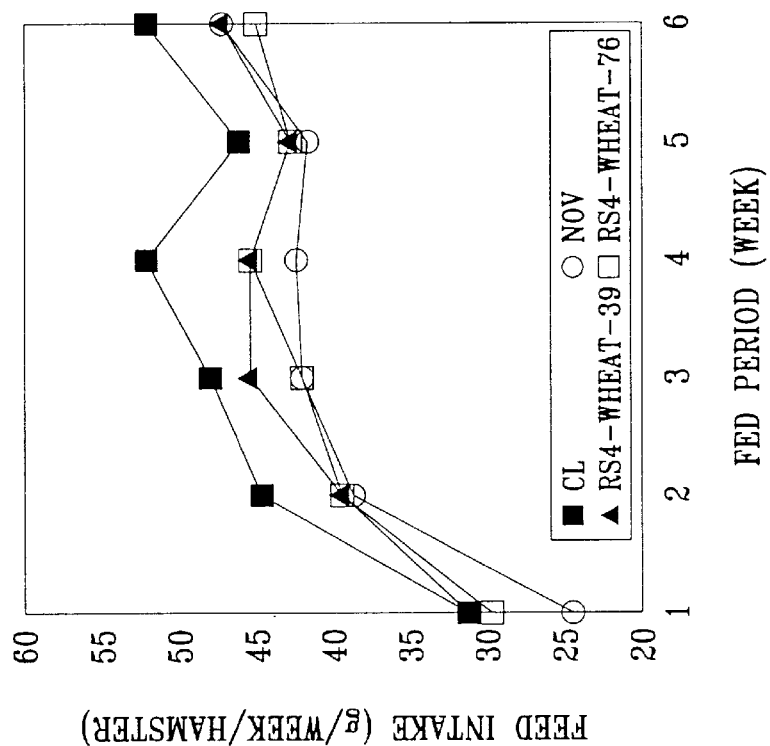
FIG. 4A is a graph of feed intake versus time in a hamster test wherein hamsters were fed four test diets, namely cellulose (CL), Novelose (NOV), $RS_4$-wheat-39, and $RS_4$-wheat-76, wherein all diets contained the same level of fiber or resistant starch (AOAC, 10%), protein (15%), fat (10%) and cholesterol (0.5%)

The group of animals on the cellulose diet consumed more feed and gained more weight than those consuming the various resistant starches (FIG. 4). The animals consuming the $RS_3$-type (Novelose) of resistant starch gained the least amount of weight because they consumed the least amount of food.

Total serum cholesterol was the same for all four groups of hamsters and independent of whether the animals consumed cellulose or resistant starch (Table IX). It is well established that insoluble sources of dietary fiber, such as cellulose and wheat bran, have little effect on total serum cholesterol. The present results showed, however, that the high density lipoprotein (HDL) fraction in blood serum contained elevated levels of cholesterol ("good" cholesterol) for the animals consuming resistant starches compared to those consuming cellulose, and the opposite was true for the levels of cholesterol in the combined fractions of very low density and low density lipoproteins (VLDL+LDL) ("bad" cholesterol).

The groups of animals consuming resistant starch, types $RS_3$ and $RS_4$, produced more short-chain fatty acids in the caecum than those on the cellulose diet, and the level of butyric acid was much higher (Table X). Those data show that the RS was fermented to produce short chain fatty acids, among other products. Butyric acid is thought to benefit the health of the colon, and to reduce the risk of colon cancer.

All the SCFA contribute to reducing the pH of the colon, which shifts populations of bacteria.

We claim:

1. A phosphorylated starch exhibiting at least about 20% resistance to α-amylase digestion using AOAC method 992.16 (1995), said starch being phosphorylated with an agent selected from the group consisting of sodium trimetaphosphate (STMP) and a mixture of sodium trimetaphosphate (STMP) and sodium tripolyphosphate (STPP).

2. The starch of claim 1, said starch being selected from the group consisting of the cereal, root, tuber, legume and high amylose starches.

3. The starch of claim 2, said starch being selected from the group consisting of wheat, corn, oat, rice, tapioca, mung bean and potato starches.

4. The starch of claim 1, said starch being selected from the group consisting of wheat and corn starches.

5. The starch of claim 1, said starch having at least about 0.1% by weight residual phosphorous.

6. The starch of claim 1, said mixture comprising from about 1–20% by weight STMP and from about 0.01–0.2% by weight STPP.

7. The starch of claim 1, said starch being cross-linked with from about 1–20% weight of said mixture, based upon the weight of the unmodified starting starch taken as 100% by weight.

8. The starch of claim 1, said starch being in the form of a distarch phosphate diester.

9. An edible food product including therein a quantity of a phosphorylated starch, said phosphorylated starch exhibiting at least about 20% resistance to α-amylase digestion using AOAC Method No. 992.16 (1995).

10. The food product of claim 9, containing up to about 35% by weight of said starch therein.

11. The food product of claim 9, said food product being selected from the group consisting of yeast-leavened or chemically-leavened baked or fried foods.

12. A method of chemically modifying starch comprising the steps of reacting said starch in the presence of water and with a phosphorylating agent under conditions of basic pH and temperature of from about 25°–70° C. for a time sufficient to yield a chemically modified starch exhibiting at least about 20% resistance to α-amylase digestion using AOAC Method 992.16 (1995), said phosphorylating agent being selected from the group consisting of sodium trimetaphosphate (STMP) and a mixture of sodium trimetaphosphate (STMP) and sodium tripolyphosphate (STPP), including the steps of first forming a slurry comprising water and said starch and thereafter adding a base to said slurry.

13. The method of claim 12, including the step of adding said phosphorylating agent to the slurry.

14. The method of claim 13, said slurry having a starch content of from about 15–60% by weight.

15. The method of claim 14, said starch content being from about 30–50 by weight.

16. The method of claim 12, said mixture comprising from about 1–20% by weight STMP and from about 0.01–0.2% by weight STPP, based upon the weight of the unmodified starch taken as 100% by weight.

17. The method of claim 12, said starch being phosphorylated with from about 1–20% by weight of said mixture, based upon the weight of the unmodified starting starch taken as 100% by weight.

18. The method of claim 12, said pH being from about 10–13.

19. The method of claim 12, said temperature being from about 30–50° C.

20. The method of claim 12, said reaction being carried out for a period of from about ⅙ to 24 h.

21. The method of claim 12, including the step of adding sodium sulfate or sodium chloride to the reaction.

22. The method of claim 12, said starch having at least about 0.1% by weight residual phosphorous.

23. The method of claim 12, said starch being selected from the group consisting of wheat, corn, oat, rice, tapioca, mung bean and potato starches.

* * * * *